(12) United States Patent
Shirasaka et al.

(10) Patent No.: US 10,404,876 B2
(45) Date of Patent: Sep. 3, 2019

(54) PRINT METHOD AND PRINT SYSTEM

(71) Applicant: Oki Data Corporation, Tokyo (JP)

(72) Inventors: Mitsuyoshi Shirasaka, Tokyo (JP); Hironobu Yamada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/013,140

(22) Filed: Jun. 20, 2018

(65) Prior Publication Data

US 2019/0007570 A1 Jan. 3, 2019

(30) Foreign Application Priority Data

Jun. 30, 2017 (JP) .................. 2017-128718
Oct. 31, 2017 (JP) .................. 2017-210119

(51) Int. Cl.
*H04N 1/00* (2006.01)

(52) U.S. Cl.
CPC ..... *H04N 1/00676* (2013.01); *H04N 1/00644* (2013.01)

(58) Field of Classification Search
USPC ....................................................... 358/1.13
See application file for complete search history.

(56) References Cited

U.S. PATENT DOCUMENTS

| | | | | |
|---|---|---|---|---|
| 5,878,320 A | * | 3/1999 | Stemmle | G03G 15/167 |
| | | | | 226/29 |
| 2004/0211330 A1 | * | 10/2004 | Clark | G06F 3/1219 |
| | | | | 101/483 |
| 2006/0017976 A1 | * | 1/2006 | Mori | G06K 15/02 |
| | | | | 358/1.18 |

FOREIGN PATENT DOCUMENTS

JP 2013-159103 A 8/2013

OTHER PUBLICATIONS

Takuma; Recording System Information Processing Device And Method Of Controlling Recording, Aug. 19, 2013, Japanese Patent Application Publication Listed On IDS, JP 2013159103, All Pages. (Year: 2013).*

* cited by examiner

*Primary Examiner* — Ngon B Nguyen

(74) *Attorney, Agent, or Firm* — Muncy, Geissler, Olds & Lowe, P.C.

(57) ABSTRACT

A print method in which carrying, cutting and printing of a continuous medium are performed according to print data includes a step of generating the print data that includes; a copy unit printing designation, a cut page number and a page number equalization designation; and a step of determining whether or not the page number equalization designation is included in the print data and whether or not a total number of print pages in printing the print data in the copy units is not a multiple of the cut page number, a step of inserting one or more of blank pages into the print data in order to make the total number of print pages, to which the blank pages are added, equal to the multiple of the cut page number when the page number equalization designation is included and the total number of print pages is not the multiple of the cut page number.

17 Claims, 18 Drawing Sheets

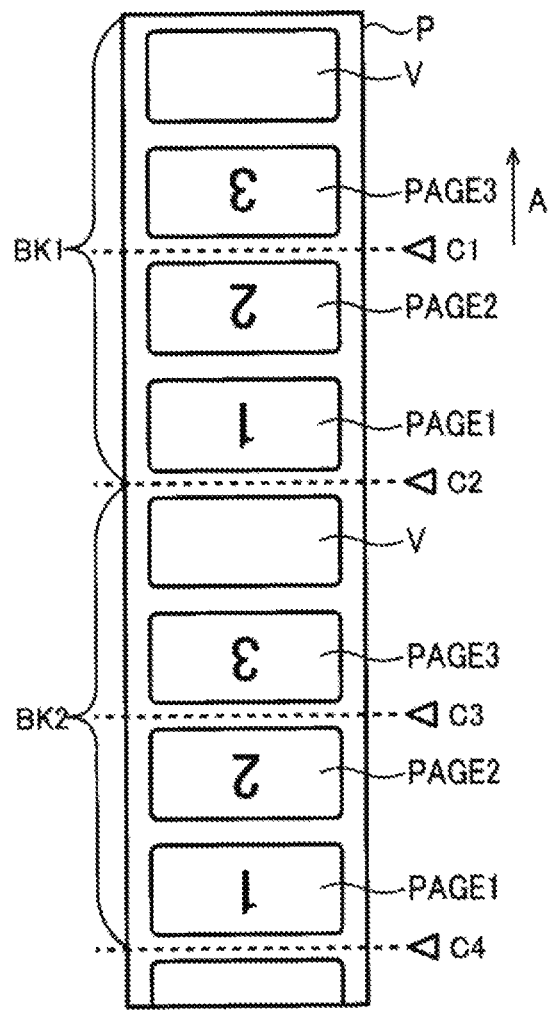
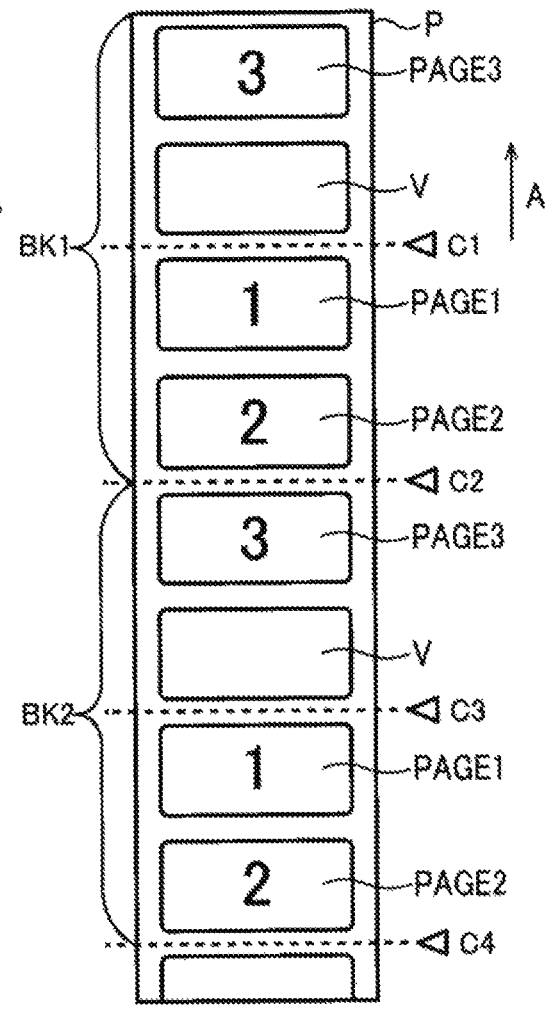

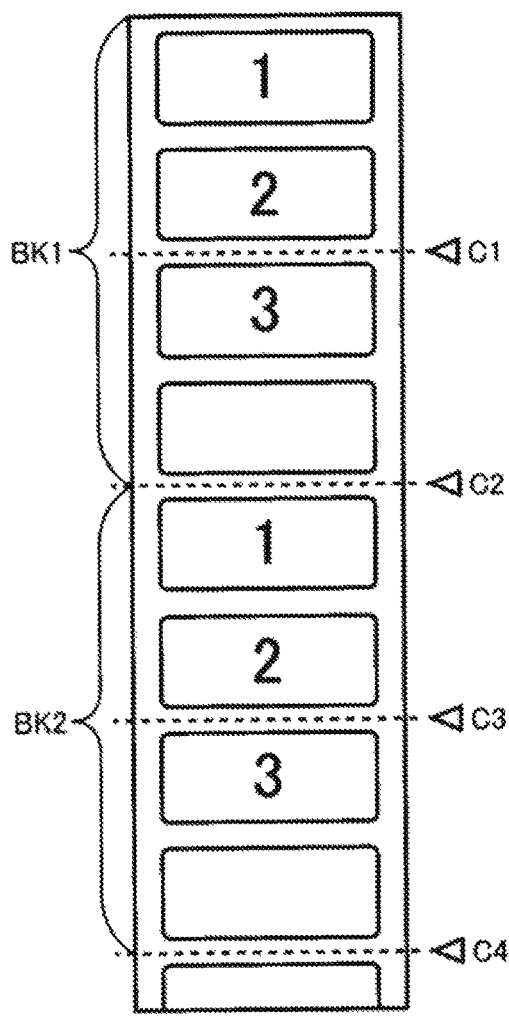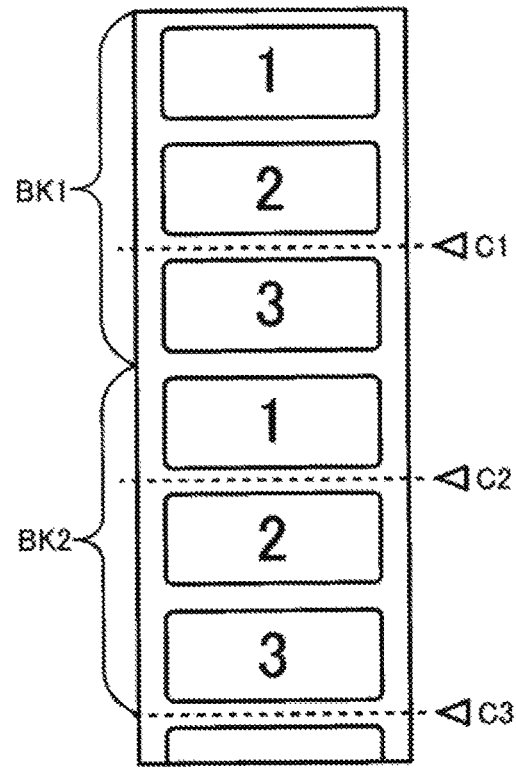
*Fig. 23A*
*Fig. 23B*

PRINT METHOD AND PRINT SYSTEM

TECHNICAL FIELD

The present invention relates to a print control apparatus that generates print data, a print apparatus that performs cutting and printing of a continuous medium based on the print data, and a printing system that includes the print control apparatus and the print apparatus.

BACKGROUND

In a conventional print apparatus, printing on a continuous medium is performed based on print data. A cutter for cutting the medium is provided. In a case where a medium length printed based on the print data is shorter than a minimum cut length by the cutter, the cutting of the medium is performed by adding a blank page into the print data (for example, see Patent Document 1).

RELATED ART

[Patent Doc. 1] JP Laid-Open Patent Application Publication 2013-159103

However, in the conventional technology, in the case of copy unit printing in which print data including an instruction to cut a medium for every designated page number is printed in copy units, the medium is cut at a trailing end of a copy unit regardless of the designated number of the pages and thus there is a problem that there may be a case where the numbers of the pages of cut media are different from each other and lengths of the cut media are not equalized. The present invention is intended to solve such a problem, and is intended to equalize the lengths of the cut media in copy unit printing.

SUMMARY

A print method disclosed in the application in which carrying, cutting and printing of a continuous medium are performed according to print data, comprises a step of generating the print data that includes; a copy unit printing designation instructing to print the print data in copy units, a cut page number instructing to cut the medium for every page number, which is the same as the cut page number, in a medium carrying direction, and a page number equalization designation instructing to equalize the page number of the medium to be cut; and a step of determining whether or not the page number equalization designation is included in the print data and whether or not a total number of print pages in printing the print data in the copy units is not a multiple of the cut page number, a step of inserting one or more of blank pages into the print data in order to make the total number of print pages, to which the blank pages are added, equal to the multiple of the cut page number when the page number equalization designation is included and the total number of print pages is not the multiple of the cut page number.

Also, a print system disclosed in the application for printing on a continuous medium includes a print control apparatus that generates print data, and a print apparatus that carries in a medium carrying direction and cuts the medium, and performs the printing on the medium according to the print data, wherein the print control apparatus is provided with a print data generation unit by which the print data is generated, the print data including; a copy unit printing designation instructing to print the print data in copy units, a cut page number instructing to cut the medium for every page number, which is the same as the cut page number, in the medium carrying direction, and a page number equalization designation instructing to equalize the page number of the medium to be cut, wherein the print apparatus further includes a print controller that inserts one or more of blank pages into the print data in order to make a total number of print pages, to which the blank pages are added, equal to a multiple of the cut page number when the page number equalization designation is included in the print data and the total number of print pages in printing the print data in the copy units is not a multiple of the cut page number.

According to the present invention, an effect is obtained that the lengths of the cut media in copy unit printing can be equalized.

BRIEF DESCRIPTION OF THE DRAWINGS

FIGS. 14A and 14B are explanatory diagrams of a blank page insertion position of a modified embodiment.

FIGS. 23A and 23B are explanatory diagrams illustrating cutting positions of a medium of the third embodiment.

DETAILED DESCRIPTION OF THE PREFERRED EMBODIMENTS

In the following, embodiments of a print method and a print system according to the present invention are described.

First Embodiment

Figure 1:
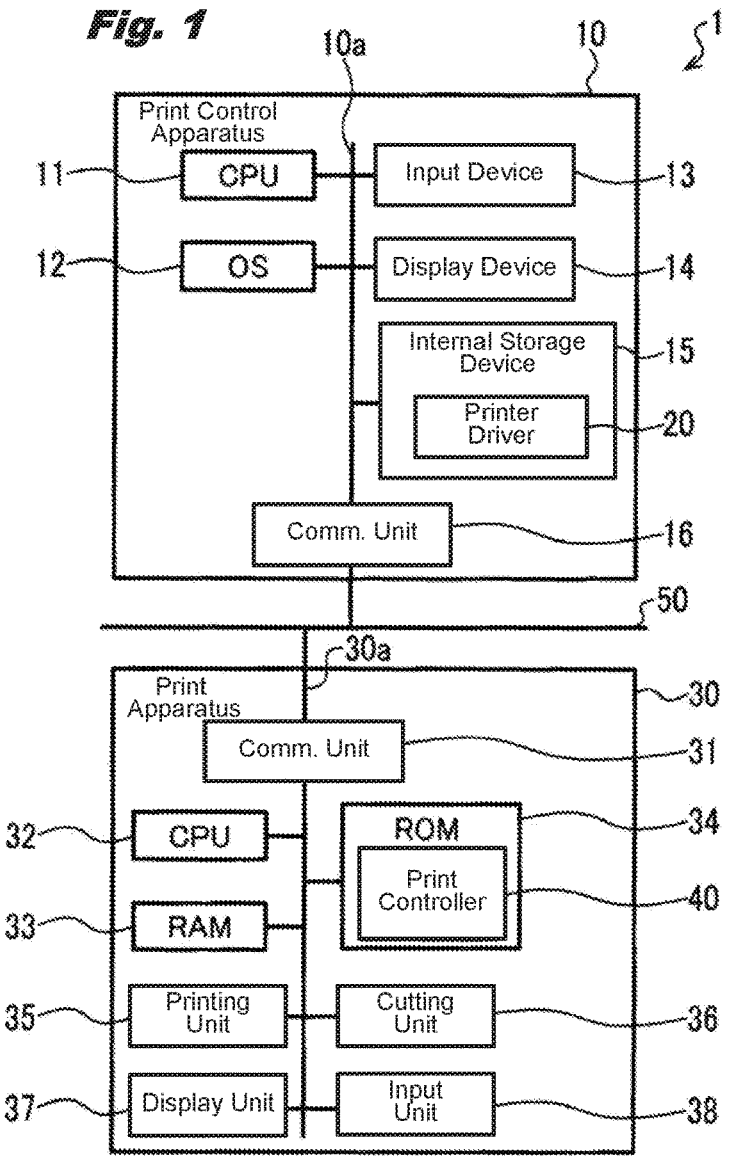
FIG. 1 is a block diagram illustrating a configuration of a printing system of a first embodiment.

FIG. 1 is a block diagram illustrating a configuration of a printing system of a first embodiment. In FIG. 1, a printing system 1 is configured by communicatively connecting a print control apparatus 10 and a print apparatus 30 via a transmission medium such as a network 50 as a communication line. The print control apparatus 10 subjects input data to image processing and generates and outputs print data that can be printed by the print apparatus 30. The print control apparatus 10 is, for example, a host computer such as a personal computer, and includes a CPU (Central Processing Unit) 11, an OS (Operating System) 12, an input device 13, a display device 14, an internal storage device 15, and a communication unit 16.

The CPU 11, the OS 12, the input device 13, the display device 14, the internal storage device 15, and the communication unit 16 are mutually connected via an internal bus 10a. The CPU 11 is a controller that controls an overall operation of the print control apparatus 10 based on the OS 12 and a control program (software) stored in the internal storage device 15. The OS 12 is basic software for controlling the print control apparatus 10.

The input device 13 as an input unit is, for example, a keyboard, a mouse or the like that accepts an operation or the like of a user or the like, and inputs data or the like from outside. The display device 14 as a display unit is, for example, an output device such as a display, and displays various screens, various kinds of information, and the like. The display device 14 displays print content and print setting information. The internal storage device 15 is a storage device such as a memory and stores a printer driver 20 and various kinds of information.

The communication unit 16 transmits or receives various kinds of information such as communication control data and the print data to or from the print apparatus 30. The printer driver 20 as a print data generation unit generates the print data that can be printed by the print apparatus 30 based on input data from application software or the like. The print data generated by the printer driver 20 is transmitted to the print apparatus 30 via the communication unit 16.

The print apparatus 30 inputs the print data from the print control apparatus 10, and performs carrying, cutting and printing of a continuous medium according to the print data. The print apparatus 30 is, for example, a printer that stores a continuous medium as a roll sheet by winding the continuous medium in a roll-like shape, and performs printing by forming an image on a print side of the roll sheet while pulling out and carrying the roll sheet.

The print apparatus 30 includes a communication unit 31, a CPU 32, a RAM (Random Access Memory) 33, a ROM (Read Only Memory) 34, a printing unit 35, a cutting unit 36, a display unit 37, and an input unit 38. The communication unit 31, the CPU 32, the RAM 33, the ROM 34, the printing unit 35, the cutting unit 36, the display unit 37, and the input unit 38 are mutually connected via an internal bus 30a.

The communication unit 31 transmits or receives various kinds of information such as communication control data and print data to or from the print control apparatus 10. The CPU 32 is a controller that controls an overall operation of the print apparatus 30 based on a control program (software) stored in the ROM 34.

The RAM 33 is a storage device that temporarily stores the print data and various kinds of information. The ROM 34 is a storage device that stores a print controller 40 as a control program. The print controller 40 analyzes the print data stored in the RAM 33 and controls a print operation performed by the printing unit 35. The printing unit 35 performs printing under the control of the print controller 40. In the present embodiment, the printing unit 35 carries the continuous medium and performs printing by forming an image on the medium using a developer.

The cutting unit 36 as a cutting unit cuts the continuous medium at a predetermined position. The cutting unit 36 is provided with a cutter which is arranged in a direction perpendicular to a medium carrying direction, and cuts the medium when the medium is carried to a predetermined position. The display unit 37 is, for example, an output device such as a display, and displays various screens, various kinds of information, and the like. The display unit 37 displays status information of the print apparatus 30, a screen for prompting a user to operate, and the like.

The input unit 38 is, for example, a button, a touch panel or the like for accepting an operation of a user or the like, and accepts an input or the like for changing a state of the print apparatus 30.

Figure 2:
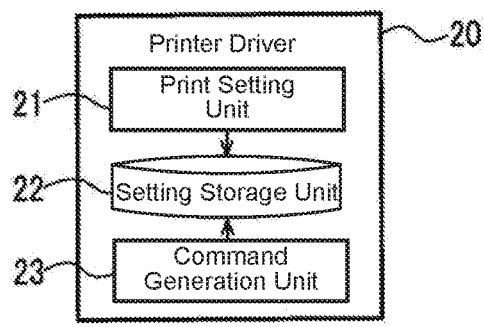
FIG. 2 is a block diagram illustrating a configuration of a printer driver of the first embodiment.

FIG. 2 is a block diagram illustrating a configuration of a printer driver of the first embodiment. In FIG. 2, the printer driver 20 includes a print setting unit 21, a setting storage unit 22, and a command generation unit 23. The print setting unit 21 displays a print setting screen on the display device 14 illustrated in FIG. 1, and performs various print settings by accepting an input operation of print setting information by a user on the print setting screen.

Figure 3:
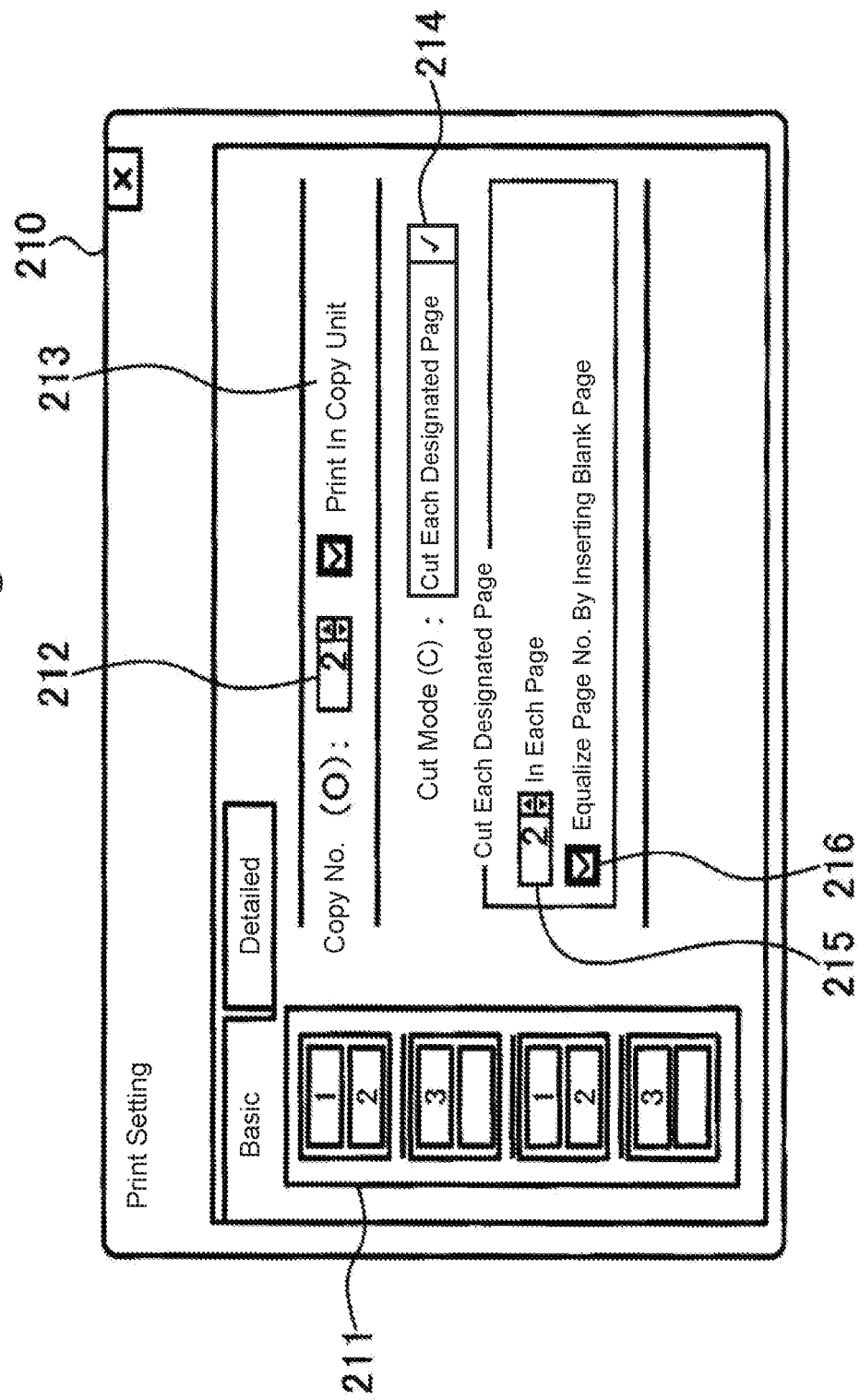
FIG. 3 is an explanatory diagram of a print setting screen of the first embodiment.

The print setting screen is, for example, a print setting screen 210 illustrated in FIG. 3, and has an outline display 211, a copy number 212, a copy unit printing designation 213, a cut mode designation 214, a cut page number 215, and a page equalization designation 216. The outline display 211 displays an indication of a cutting position of a medium determined based on various kinds of print setting information that is set in the print setting screen 210.

The copy number 212 specifies the number of print copies of the print data generated from the input data from the application software as an upper layer. The copy unit printing designation 213 instructs to perform copy unit printing in which the print data is printed in copy units.

Here, the term "copy unit printing" means that, for example, when the print data is configured by a total of 3 pages including pages 1-3 and the print copy number is designated as 2 copies, as the first copy, 3 pages of the print data are printed in the order of the page 1, the page 2 and the page 3, and, as the second copy, 3 pages of the print data are printed in the order of the page 1, the page 2 and the page 3, and a total of 6 pages are printed.

Further, the term "page" means a print region having a predetermined length in the medium carrying direction of the continuous medium. For example, a print region corresponding to 1 (one) label unit provided maintaining a predetermined interval on a mount of the medium in the medium carrying direction is taken as 1 (one) page. However, it is not a required condition to have a label unit, and even a medium that does not have a label unit, a print region having a predetermined length in the medium carrying direction can be taken as 1 (one) page.

The cut mode designation 214 specifies a method for cutting the medium. In the present embodiment, it is assumed that "to cut each designated page" is designated in which the medium is cut for each designated page. In the case where "to cut each designated page" is designated by the cut mode designation 214, the cut page number 215 as a cut page number specifies a page number such that the medium is cut for every predetermined page number. The medium is cut for every page number designated by the cut page number 215. For example, in the case where "for every 2 pages" is designated by the cut page number 215, the medium is cut after the 1st page and the 2nd page 2 of the print data (between the page 2 and the page 3). In the specification, the designated page means one or more pages that are designated by the operator.

In the case where "to cut each designated page" is designated by the cut mode designation 214, the page equalization designation 216 as a page number equalization designation specifies (selects) whether or not to equalize the page number of the medium to be cut by inserting a blank page. The term "to equalize the page number by inserting a blank page" means that, in the case where a trailing end of a copy unit of the print data does not match the page number that is designated by the cut page number 215 and with which the medium is to be cut, a blank page is added to the end of the print data to perform equalization such that the trailing end of the copy unit of the print data matches the page number that is designated by the cut page number 215 and with which the medium is to be cut. It is also possible that the "page equalization designation" is designated by the cut mode designation 214.

In this way, the print setting unit 21 displays the print setting screen on the display device 14 illustrated in FIG. 1 and accepts, via the print setting screen, inputs such as a copy unit printing designation, a cut page number and a page number equalization designation. The setting storage unit 22 is a storage device that stores the print setting information accepted by the print setting unit 21.

Based on the print setting information stored in the setting storage unit 22, the command generation unit 23 converts the input data from the application software into commands that can be recognized by the print apparatus 30 illustrated in FIG. 1 and generates a print job as the print data. This print job contains print setting information such as the copy unit printing designation, the cut page number and the page number equalization designation entered using the print setting screen.

In this way, the printer driver 20 generates the print data that includes: the copy unit printing designation that instructs to print in copy units; the cut page number that instructs to cut the medium for every predetermined page number in the medium carrying direction; and the page number equalization designation that instructs to equalize the page number of the medium to be cut.

Figure 4:
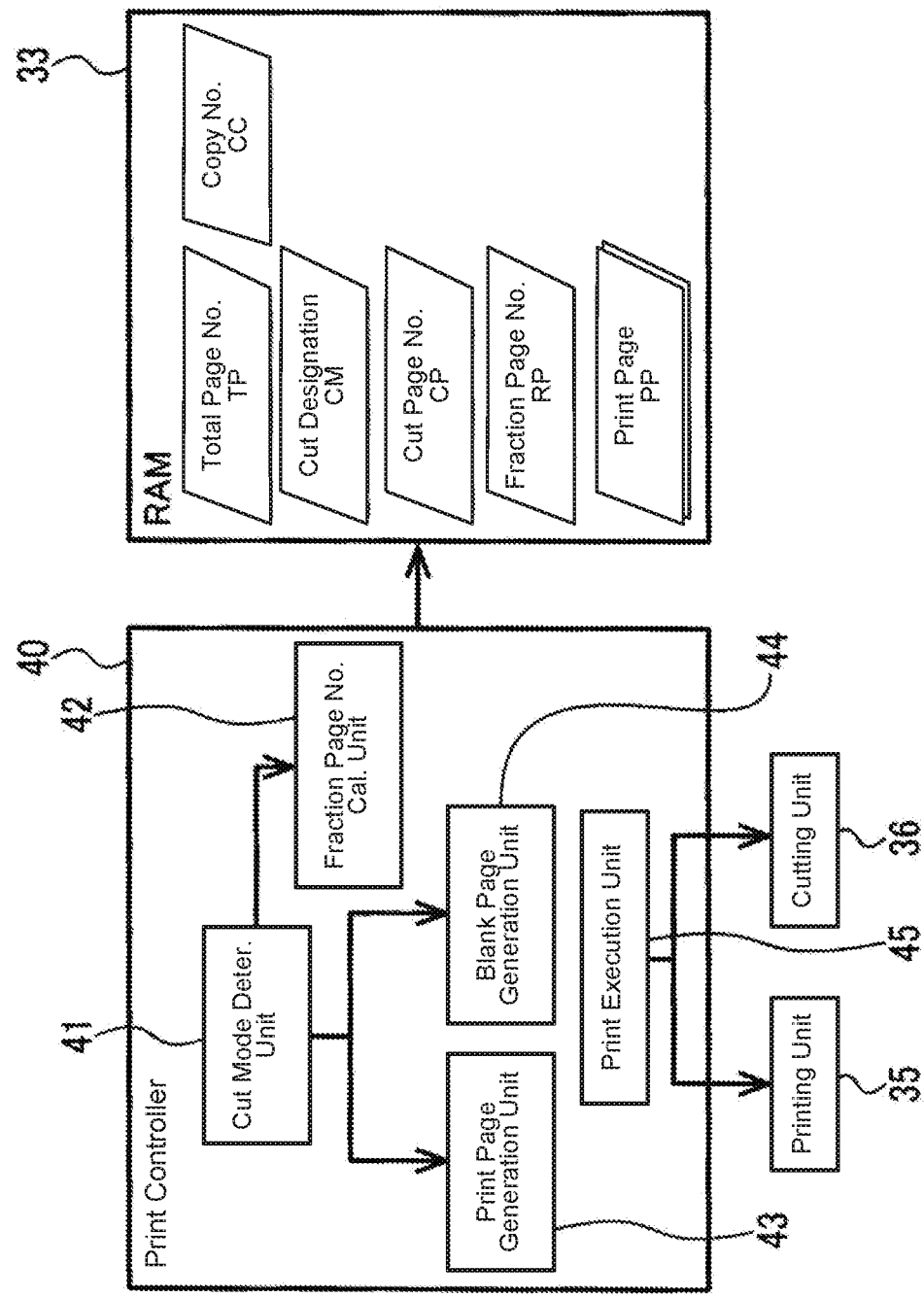
FIG. 4 is a block diagram illustrating a configuration of a print controller of a print apparatus of the first embodiment.

FIG. 4 is a block diagram illustrating a configuration of the print controller of the print apparatus of the first embodiment. In FIG. 4, the print controller 40 includes a cut mode determination unit 41, a fraction page number calculation unit 42, a print page generation unit 43, a blank page generation unit 44, and a print execution unit 45.

The cut mode determination unit 41 determines various cut modes based on the commands of the print data received from the print control apparatus 10 illustrated in FIG. 1. In the present embodiment, it is assumed that whether or not the cut mode is "to cut each designated page" and "to equalize the page number" (page number equalization designation) is determined.

Based on the print data and the cut mode determined by the cut mode determination unit 41, the fraction page number calculation unit 42 divides the page number contained in the print data by the cut page number designated by the cut page number 215 of the print setting screen 210 illustrated in FIG. 3, and calculates the remainder as the fraction page number. The print page generation unit 43 generates, from the print data, image data for printing an image on the medium by the printing unit 35 as a print page.

The blank page generation unit 44 generates image data of blank pages of a number corresponding to the page number obtained by subtracting the fraction page number calculated by the fraction page number calculation unit 42 from the cut page number designated by the cut page number 215 of the print setting screen 210 illustrated in FIG. 3, and adds the image data of the blank pages to the trailing end of the print pages generated by the print page generation unit 43.

That is, when the print page number in printing the print data in copy units is not a multiple of the number of the cut pages, the blank page generation unit 44 inserts blank pages into the print data such that the print page number is a multiple of the cut page number and the page number is equalized when the medium is cut.

The print execution unit 45 outputs a print instruction to the printing unit 35 in accordance with the print pages and the blank pages generated by the print page generation unit 43 and the blank page generation unit 44 and outputs to the cutting unit 36 an instruction to cut the medium according to the number of the cut pages.

Further, the RAM 33 stores a total page number TP, a copy number CC, a cut designation CM, a cut page number CP, a fraction page number RP, and a print page PP. The total page number TP is information indicating the total number of the pages of the print data transmitted from the print control apparatus 10 illustrated in FIG. 1.

The copy number CC is information indicating the print copy number designated by the print data. The cut designation CM is information indicating the cut mode designated by the print data or whether or not a blank page is inserted. The cut page number CP is information indicating the cut page number designated by the print data.

The fraction page number RP is information indicating the fraction page number calculated by the fraction page number calculation unit 42. The print pages PP are information about the print pages and the blank pages generated by the print page generation unit 43 and the blank page generation unit 44. The print pages PP store multiple print pages and multiple blank pages.

In the case where copy unit printing is instructed and the cut mode determination unit 41 has determined that a page number equalization designation is included in the print data, when the print page number in printing the print data in copy unit is not a multiple of the cut page number CP, the print controller 40 configured as described above inserts the blank pages into the print data so as to make the print page number a multiple of the cut page number CP.

Figure 5:
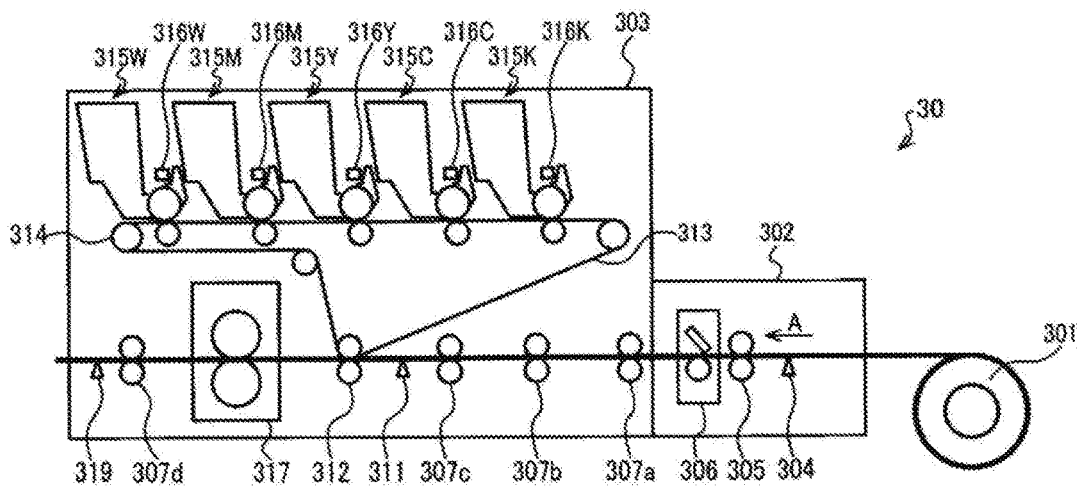
FIG. 5 is a schematic cross-sectional side view illustrating a configuration of a print apparatus of the first embodiment.

FIG. 5 is a schematic cross-sectional side view illustrating a configuration of the print apparatus of the first embodiment. In FIG. 5, the print apparatus 30 is a printer that performs printing by forming an image on a medium 301 as a print medium wound in a roll-like shape, and is, for example, an electrophotographic printer.

The print apparatus 30 has a roll sheet feeder unit 302 for feeding a continuous elongated medium 301 to the printer unit 303 and the printer unit 303 for forming an image on the medium 301 fed out from the roll sheet feeder unit 302.

The roll sheet feeder unit 302 includes a cutter IN sensor 304, a feed roller 305 as a carrying device, and a cutter unit 306 as a cutting device. The cutter IN sensor 304 is arranged on an upstream side of the feed roller 305 and the cutter unit 306 in the medium carrying direction, and detects the medium 301.

The feed roller 305 is a pair of rollers that is arranged on a downstream side of the cutter IN sensor 304 in the medium carrying direction and carries the medium 301 by sandwiching the medium 301 and rotating. The feed roller 305, together with feed rollers 307a-307d, forms a carrying unit as a carrying device carrying the medium 301 in the medium carrying direction indicated by an arrow A in FIG. 5.

The cutter unit 306 is a rotary cutter that is arranged on a downstream side of the feed roller 305 in the medium carrying direction and cuts the medium 301 carried by the carrying unit at a predetermined length. By rotating, the cutter unit 306 can cut the carried medium 301 in a direction substantially orthogonal to the medium carrying direction. The cutter unit 306 cuts the medium detected by the cutter IN sensor 304 at a predetermined length in the medium carrying direction.

The printer unit 303 includes the feed rollers 307a-307d, a light sensor 311, a secondary transfer roller 312, a carrying belt 313, a belt roller 314, ID units 315K, 315C, 315Y, 315M, 315W, LED heads 316K, 316C, 316Y, 316M, 316W, a fuser 317, and an ejection sensor 319.

The feed roller 307a is a pair of rollers that is arranged on a downstream side of the cutter unit 306 in the medium carrying direction and carries the medium 301 by sandwiching the medium 301 and rotating. The feed roller 307b is a pair of rollers that is arranged on a downstream side of the feed roller 307a in the medium carrying direction and carries the medium 301 by sandwiching the medium 301 and rotating. The feed roller 307c is a pair of rollers that is arranged on a downstream side of the feed roller 307b in the medium carrying direction and carries the medium 301 by sandwiching the medium 301 and rotating.

The light sensor 311 is a medium detection unit that is arranged on a downstream side of the feed roller 307c in the medium carrying direction. The light sensor 311 is used to detect the medium 301 and to adjust a position of writing a toner image by the secondary transfer roller 312 to the detected medium 301. The secondary transfer roller 312 is arranged on a downstream side of the light sensor 311 in the medium carrying direction and transfers the toner image formed on the carrying belt 313 to the medium 301. The secondary transfer roller 312 transfers the toner image formed on the carrying belt 313 to the medium 301 by applying a high voltage.

The carrying belt 313 is rotatably stretched over the multiple rollers such as the belt roller 314, and carries the toner image formed by the ID units 315K, 315C, 315Y, 315M, 315W to the secondary transfer roller 312. The belt roller 314 is a roller that rotatably stretches the carrying belt 313 and rotatably drives the carrying belt 313.

The ID (Image Drum) units 315K, 315C, 315Y, 315M, 315W have photosensitive drums which are multiple image carriers that are rotatably provided, and respectively form toner images of a black color (K), a cyan color (C), a yellow color (Y), a magenta color (M), and a white color (W) on the photosensitive drums, and performed image formation operations to primarily transfer the toner images onto the oppositely arranged carrying belt 313.

The LED (Light Emitting Diode) heads 316K, 316C, 316Y, 316M, 316W respectively selectively expose surfaces of the photosensitive drums of the ID units 315K, 315C, 315Y, 315M, 315W to form electrostatic latent images. Toners are supplied to the electrostatic latent images formed on the photosensitive drums, and toner images are formed.

The ID units 315K, 315C, 315Y, 315M, 315W, the LED heads 316K, 316C, 316Y, 316M, 316W, the secondary transfer roller 312, and the carrying belt 313 perform image formation in which a toner image is formed on the medium 301.

The fuser 317 is arranged on a downstream side of the secondary transfer roller 312 in the medium carrying direction, and carries the medium 301 and fuses the toner image transferred onto the medium 301. The fuser 317 includes a fuser roller having a heat application member, and fuses the toner image transferred onto the medium 301 by applying heat and pressure. The feed roller 307d is a pair of rollers that is arranged on a downstream side of the fuser 317 in the medium carrying direction and ejects the medium 301 to the outside of the apparatus by sandwiching the medium 301 and rotating.

The ejection sensor 319 is a sensor that is arranged on a downstream side of the feed roller 307d in the medium carrying direction, and detects a leading edge and a trailing edge of the medium 301 carried by the feed roller 307d and detects presence or absence of the medium 301. In the present embodiment, it is described that the cutter unit 306 is arranged on an upstream side of the secondary transfer roller 312 in the medium carrying direction. However, the present invention is not limited thereto, and it is also possible that the cutter unit 306 is arranged on a downstream side of the secondary transfer roller 312 in the medium carrying direction.

The print apparatus 30 configured as described above inputs the print data from the print control apparatus 10 illustrated in FIG. 1, and performs carrying, cutting and printing of the continuous medium 301 according to the print data.

Figure 6:
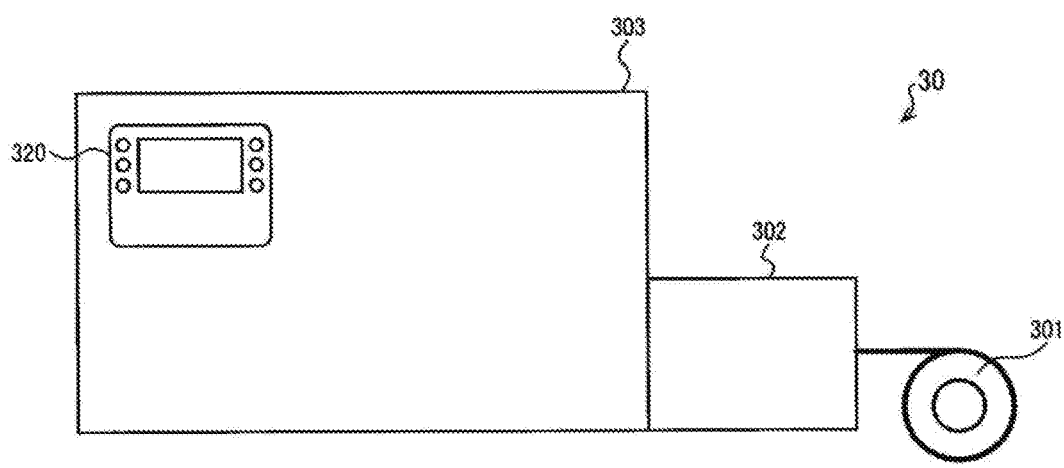
FIG. 6 is a side view of the print apparatus of the first embodiment.

FIG. 6 is a side view of the print apparatus of the first embodiment. In FIG. 6, the print apparatus 30 has an operation display unit 320 in the printer unit 303. The operation display unit 320 includes the display unit 37 and the input unit 38 illustrated in FIG. 1. The operation display unit 320 includes an output device such as a display displaying various screens and various kinds of information and the like, and an input device such as a switch accepting an input operation of a user.

Figure 7:
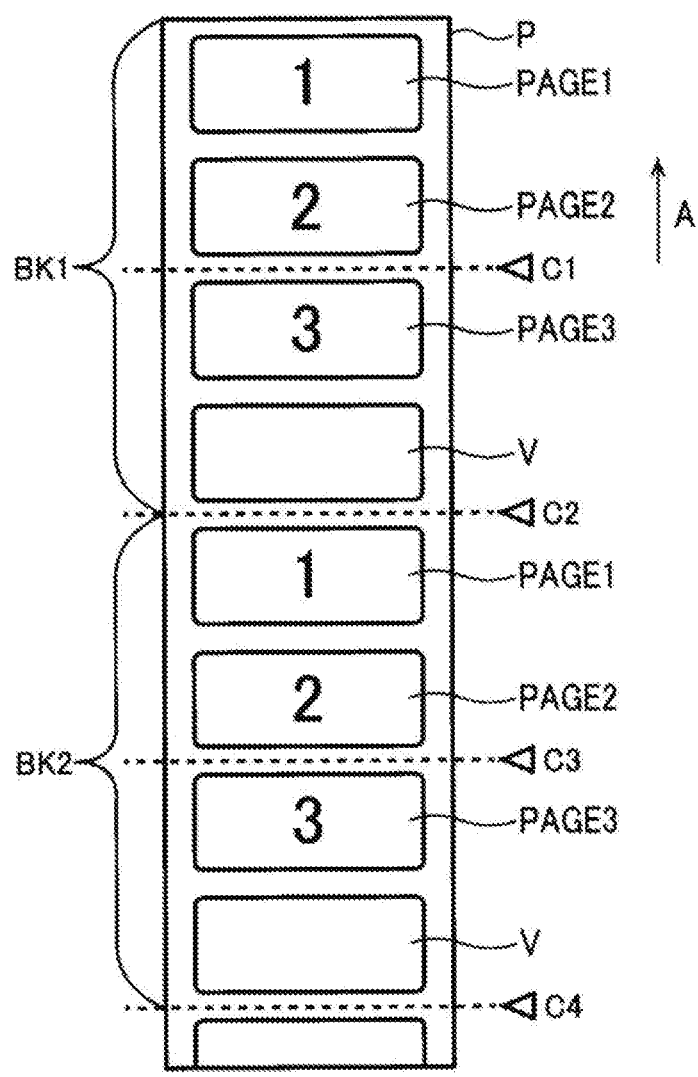
FIG. 7 is an explanatory diagram illustrating cutting positions of a medium of the first embodiment.

FIG. 7 is an explanatory diagram illustrating cutting positions of a medium of the first embodiment. In FIG. 7, a medium P is an elongated continuous sheet, and is carried in the medium carrying direction indicated by an arrow A in the drawing and is printed. In FIG. 7, an example is illustrated in which, as print setting information, the print copy number is "2," the cut mode is "to cut each designated page" and "to equalize the page number by inserting a blank page," the cut page number is designated as "2," and the print data for which a total number of the pages is "3" is printed in copy units on the medium P.

Regarding positions at which the medium P is cut, from a leading edge of the medium P in the medium carrying direction, as the first copy BK1, the medium P is cut at a cutting position C1 after a PAGE 1 as the first page and a PAGE 2 as the second page, and then is cut at a cutting position C2 after a PAGE 3 as the third page and a blank page V. Further, as the second copy BK2, the medium P is cut at a cutting position C3 after the PAGE 1 and the PAGE 2, and then is cut at a cutting position C4 after the PAGE 3 and the blank page V.

At the cutting position C1 and the cutting position C3, since the cut page number is designated as "2," the medium P is cut after 2 pages including the PAGE 1 and the PAGE 2. Further, at the cutting position C2 and the cutting position C4, since "to cut each designated page" and "to equalize the page number by inserting a blank page" are designated, a blank page is inserted next to the PAGE 3, and the medium P is cut after 2 pages of the print data.

An effect of the above-described configuration is described.

First, a print setting process performed by the printer driver 20 of the print control apparatus 10 illustrated in FIG. 1 is described based on FIG. 2 with reference to FIGS. 1 and 3.

The print setting unit 21 of the printer driver 20 displays the print setting screen 210 on the display device 14 in order to allow a user to perform print setting before the print data is transmitted to the print apparatus 30. The print setting unit 21 having displayed the print setting screen 210 receives a print setting input operation by a user in the print setting screen 210 and stores the input print setting information in the setting storage unit 22.

In the present embodiment, it is assumed that, in the print setting screen 210, for example, "2" is designated by the copy number 212; "to print in copy units" is designated by the copy unit printing designation 213; "to cut each designated page" is designated by the cut mode designation 214; "2" is designated by the cut page number 215; and "to equalize the page number by inserting a blank page" is designated by the page equalization designation 216.

The command generation unit 23 of the printer driver 20 generates input data from the application software as the print data for the print apparatus 30 in accordance with the print setting information stored in the setting storage unit 22, and transmits the print data to the print apparatus 30.

The print data generated by the command generation unit 23 includes the information about the total number of the pages to be printed, and the information about the number of the copies designated by the copy number 212 of the print setting screen 210, the information about the copy unit printing instruction designated by the copy unit printing designation 213, the information about the cut mode designation designated by the cut mode designation 214, the information about the cut page number designated by the cut page number 215, and the information about page equalization designated by the page equalization designation 216.

Figure 8:
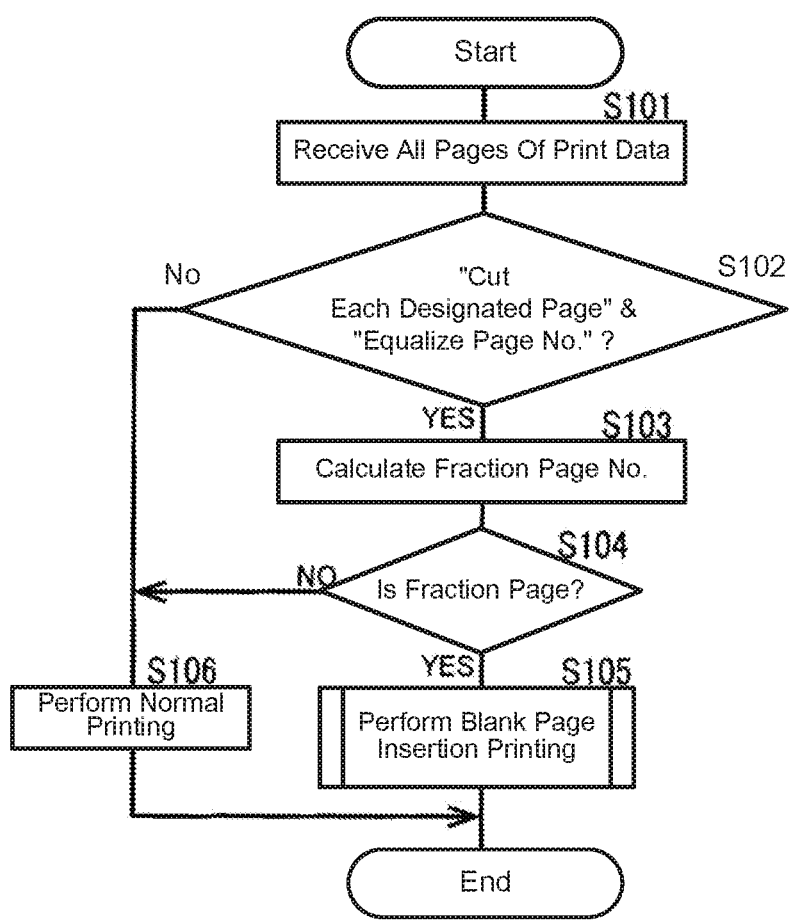
FIG. 8 is a flow diagram illustrating a flow of a print process of the first embodiment.

Next, a print process performed by the print apparatus is described according to steps each indicated with an "S" in the flow diagram of FIG. 8 which illustrates a flow of the print process of the first embodiment with reference to FIGS. 1 and 4.

S101: The communication unit 31 of the print apparatus 30 receives all the pages of the print data transmitted from the printer driver 20 of the print control apparatus 10. The print controller 40 stores the information about the number of the copies included in the print data received by the communication unit 31 in the copy number CC of the RAM 33, the information about the total number of the pages in the total page number TP of the RAM 33, the information about the cut mode designation in the cut designation CM of the RAM 33, the information about the cut page number in the cut page number CP.

S102: The cut mode determination unit 41 of the print controller 40 determines whether or not "to cut each designated page" and "to equalize the page number by inserting a blank page" (the page number equalization designation) are designated by the cut designation CM of the RAM 33. When it is determined that the designation is made, the process proceeds to S103. When it is determined that the designation is not made, the process proceeds to S106 in order to perform normal printing.

S103: When the cut mode determination unit 41 has determined that "to cut each designated page" and "to equalize the page number by inserting a blank page" are designated, the fraction page number calculation unit 42 divides the total page number TP of the RAM 33 by the cut page number CP and stores the remainder as the fraction page number in the fraction page number RP of the RAM 33.

S104: The print controller 40 determines presence or absence of the fraction page number RP calculated by the fraction page number calculation unit 42. When it is determined that there is a fraction page, that is, when it is determined that the fraction page number RP is not "0," the process proceeds to S105. When it is determined that there is not a fraction page, that is, when it is determined that the fraction page number RP is "0," the process proceeds to S106.

S105: When it is determined that the fraction page number RP is not "0," that is, when it is determined that there is a fraction page, the print controller 40 performs a blank page insertion print process and terminates the present process. Details of the blank page insertion print process will be described later.

S106: The print controller 40 performs normal printing in which a blank page is not inserted, and terminates the present process. Here, the term "normal printing" means printing in which the medium is cut at a designated page number and the medium is cut at a trailing end of a copy unit.

Figure 9:
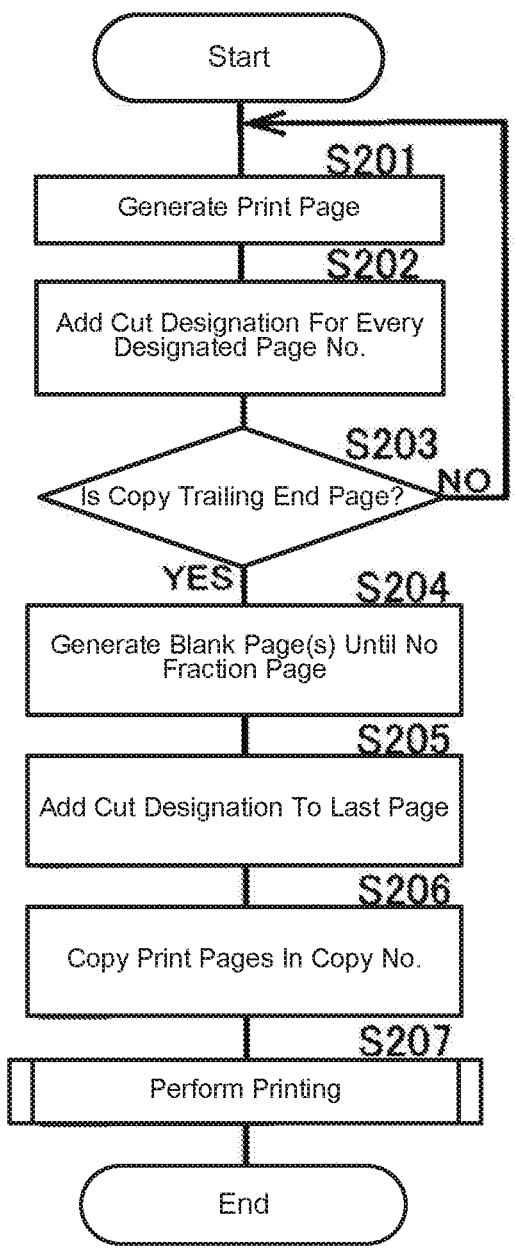
FIG. 9 is a flow diagram illustrating a flow of a blank page insertion print process of the first embodiment.

Next, a blank page insertion print process performed by the print apparatus is described according to steps each indicated with an "S" in the flow diagram of FIG. 9 which illustrates a flow of the blank page insertion print process of the first embodiment with reference to FIGS. 1, 4 and 7.

S201: The print page generation unit 43 of the print controller 40 generates image data as one print page to be printed on one page of the medium based on the print data received from the print control apparatus 10, and stores the image data in the print pages PP of the RAM 33. For example, as illustrated in FIG. 7, in the case where the print data includes three pages, the print page generation unit 43 stores image data of the PAGE 1, the PAGE 2, and the PAGE 3 of the first copy in the print pages PP.

S202: The print page generation unit 43 adds a cut designation to perform cutting for every designated page number. Specifically, the print page generation unit 43 adds information about an instruction to cut the medium after printing to the print pages PP which have reached a multiple of the cut page number CP of the RAM 33.

For example, as illustrated in FIG. 7, information about an instruction to cut the medium after printing is added to the print page PP of the PAGE 2 of the first copy.

S203: The print page generation unit 43 determines whether or not the print page generated at S201 is a copy trailing end page. When it is determined that the print page is a copy trailing end page, the process proceeds to S204, and when it is determined that the print page is not a copy trailing end page, the process returns to S201.

S204: When it is determined that the print page generated by the print page generation unit 43 is a copy trailing end page, the blank page generation unit 44 generates one or many blank pages until there is not a fraction page and inserts the blank page after the final page of the print pages PP. Specifically, the blank page generation unit 44 generates blank pages of a number equal to "the cut page number CP—the fraction page number RP" and stores the blank pages by inserting the blank pages after the final page of the print pages PP of the RAM 33.

For example, as illustrated in FIG. 7, the generated blank page V is inserted next to the print page PP of the PAGE 3 of the first copy BK1.

S205: The blank page generation unit 44 adds a cut designation to the final page. Specifically, the blank page generation unit 44 adds information about an instruction to cut the medium after printing to the print page PP of the final page.

S206: The print controller 40 copies the print pages in a copy number equal to the copy number to be printed. Specifically, the print controller 40 copies the print pages PP generated by the print page generation unit 43 and the blank page generation unit 44 to the RAM 33 of a number equal to the copy number CC.

S207: The print controller 40 performs printing by instructing the print execution unit 45 to perform printing of the print pages PP of a number equal to the copy number CC, and terminates the present process.

Figure 10:
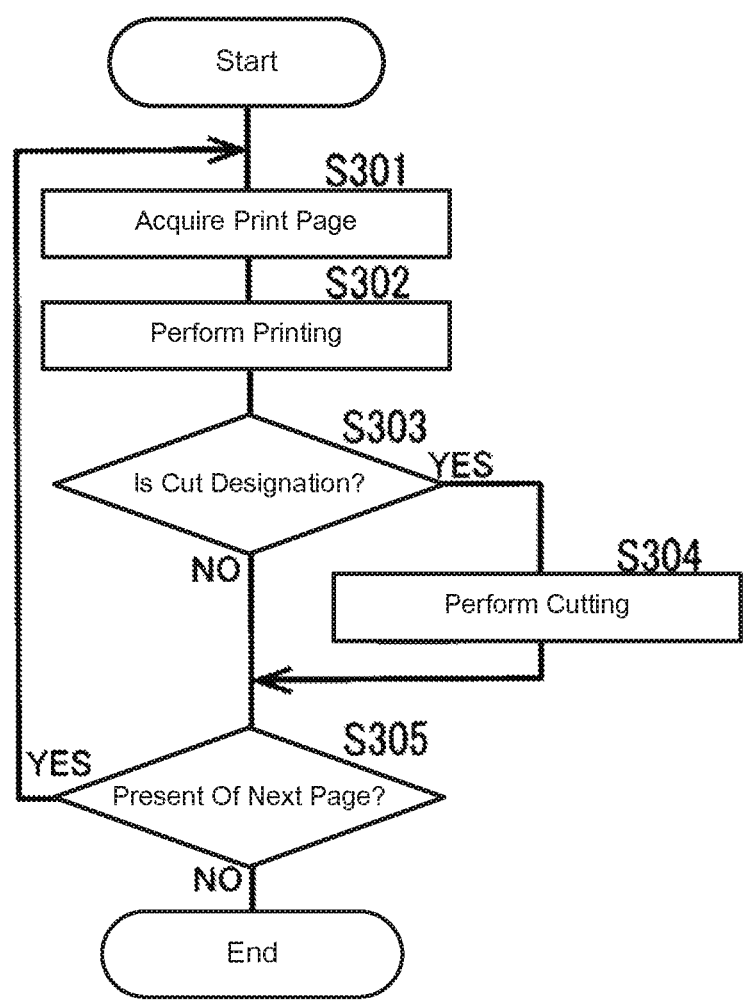
FIG. 10 is a flow diagram illustrating a flow of a print execution process of the first embodiment.

Next, a print execution process performed by the print apparatus is described according to steps each indicated with an "S" in the flow diagram of FIG. 10 which illustrates a flow of the print execution process of the first embodiment with reference to FIGS. 1, 4 and 7.

S301: The print execution unit 45 of the print controller 40 sequentially acquires the information about the print pages to be printed from the print pages PP of a number equal to the copy number CC stored in the RAM 33.

S302: The print execution unit 45 performs printing by forming an image on the medium using the printing unit 35 based on the acquired information about the print pages.

S303: The print execution unit 45 determines whether or not there is a cut designation in the information about the print pages printed. When it is determined that there is a cut designation, the process proceeds to S304 in order to cut the medium. When it is determined that there is not a cut designation, the process proceeds to S305.

S304: the print execution unit 45 having determined that there is a cut designation performs cutting of the medium using the cutting unit 36.

S305: The print execution unit 45 determines presence or absence of the print page of the next page to be printed. When it is determined that there is a print page to be printed, the process returns to S301 in order to continue the printing. When it is determined that there is not a print page to be printed, the present process is terminated.

As illustrated in FIG. 7, when the print data configured by a total number of 3 pages is printed with the print copy number being "2," the cut mode being "to cut each designated page" and "to equalize the page number by inserting a blank page," and the cut page number being "2," since the fraction page number RP is "1" (the remainder of 3 pages (the total number of the pages)÷2 (the number of the cut pages)), 1 blank page (the cut page number "2"—the fraction page number RP "1"=1 blank page) is inserted to the trailing end of the copy unit, and the medium is cut at the trailing end of the blank page.

In this way, in the present embodiment, in the case where copy unit printing is instructed by the print data and the cut mode determination unit 41 has determined that a page number equalization designation is included in the print data, when the print page number in printing the print data in copy units is not a multiple of the number of the cut pages, by inserting a blank page into the print data to make the print page number a multiple of the number of the cut pages, the print controller 40 of the print apparatus 30 can equalize the length of the cut medium in the copy unit printing.

Further, in the printing system 1 of the present embodiment, in the printing method in which carrying, cutting and printing of the continuous medium are performed according to the print data, the length of the cut medium can be equalized in the copy unit printing by including: a step of generating the print data that includes a copy unit printing designation instructing to print in copy units, a cut page number instructing to cut the medium for every predetermined page number in the medium carrying direction, and a page number equalization designation instructing to equalize the page number of the medium to be cut; and a step in which, in the case where the page number equalization designation is included in the print data, when the print page number in printing the print data in copy units is not a multiple of the number of the cut pages, a blank page is inserted into the print data to make the print page number a multiple of the number of the cut pages.

As a result, user convenience can be improved when the printed medium is stored. For example, when a printed medium is stored in a storage unit such as a small bag or a filing case in which a length of a medium to be stored is limited to a predetermined length, lengths of multiple media printed in copy units can be equalized to the length of the storage unit.

In the present embodiment, an example is described in which a blank page is inserted at a trailing portion in printing in copy units. However, as illustrated in FIG. 14A, it is also possible that, in the case of reverse order printing in which printing is performed in an order of from the final page (for example, the page 3) to the foremost page (for example, the page 1) and further the printing direction is rotated by 180 degrees, a blank page is inserted before a foremost page (for example, the page 3) which is a leading portion of the print data. Further, as illustrated in FIG. 14B, it is also possible that, in the case where printing is performed an order of from the final page (for example, the page 3) to the foremost page (for example, the page 1) and the printing direction is not rotated, a blank page is inserted next to the final page (for example, the page 3) of the print data.

Further, in the present embodiment, the print setting screen 210 illustrated in FIG. 3 is displayed on the display device 14 by the printer driver 20 of the print control apparatus 10. However, it is also possible that the print setting screen 210 is displayed on the display unit 37 of the print apparatus 30.

For example, it is assumed that, in a setting operation by a user before printing is performed, the print controller 40 of the print apparatus 30 displays the print setting screen 210 illustrated in FIG. 3 on the display unit 37, and stores, in a storage device such as the RAM 33, and presets the information about the number of the copies designated by the copy number 212 of the print setting screen 210, the information of the copy unit printing instruction designated by the copy unit printing designation 213, the information about the cut mode designation designated by the cut mode designation 214, the information about the cut page number designated by the cut page number 215, and the information about page equalization designated by the page equalization designation 216. Further, it is also possible that, when the print data is received from the print control apparatus 10, the print controller 40 of the print apparatus 30 displays the print setting screen 210 illustrated in FIG. 3 on the display unit 37.

As described above, in the first embodiment, an effect is obtained that, in the case where copy unit printing is instructed by the print data and a page number equalization designation is included, when the print page number in printing the print data in copy units is not a multiple of the number of the cut pages, by inserting a blank page into the print data to make the print page number a multiple of the number of the cut pages, the length of the cut medium in the copy unit printing can be equalized. Further, an effect is obtained that the user convenience can be improved when the printed medium is stored.

Second Embodiment

A configuration of a second embodiment is obtained by adding a cut mode change unit to the print controller of the first embodiment. The configuration of the second embodiment is described based on a block diagram of FIG. 11 illustrating a configuration of a print controller of the second embodiment.

A part that is the same as in the above-described first embodiment is indicated using the same reference numeral symbol and description thereof is omitted.

Figure 11:
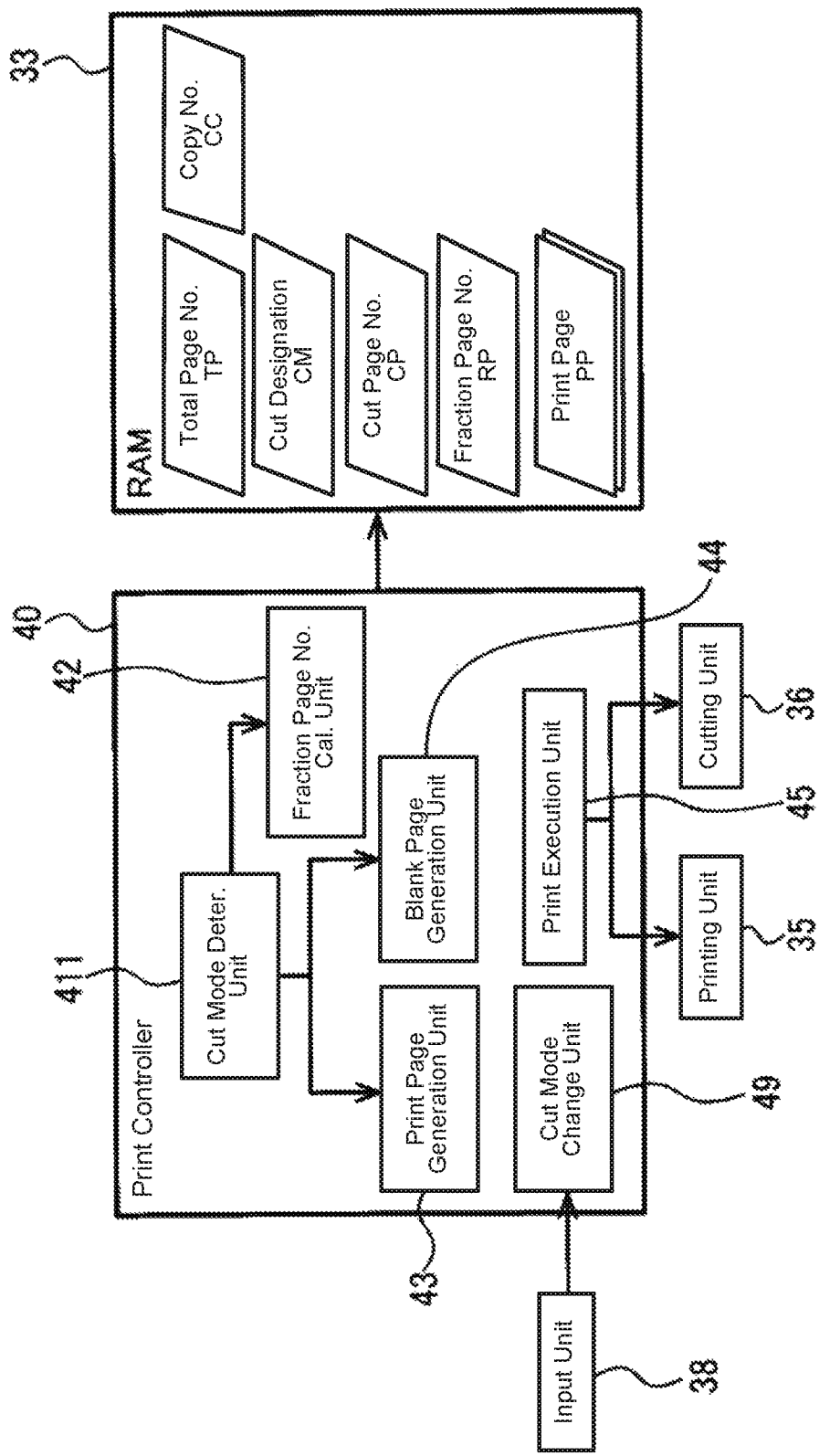
FIG. 11 is a block diagram illustrating a configuration of a print controller of a second embodiment.

In FIG. 11, a print controller 40 includes a cut mode determination unit 411, a fraction page number calculation unit 42, a print page generation unit 43, a blank page generation unit 44, a print execution unit 45, and a cut mode change unit 49.

The cut mode determination unit 411 determines various cut modes based on the commands of the print data received from the print control apparatus 10 illustrated in FIG. 1, and, in the case where the cut mode is "to cut each designated page" and "to equalize pages" (the page number equalization designation), displays a confirmation screen on the display unit 37 and allows a user to select in the confirmation screen any one of "to print by inserting a blank page" (to allow a blank page to be inserted into the print data), "to cancel printing," and "to print without inserting a blank page" (to prohibit a blank page from being inserted into the print data).

In this way, in the case where the print data includes a page number equalization designation, the cut mode determination unit 411 as a selection unit accepts a selection operation that permits or prohibits insertion of a blank page into the print data.

The cut mode change unit 49 changes the cut mode. In the present embodiment, when "to print without inserting a blank page" is selected in the confirmation screen displayed by the cut mode determination unit 41, the cut mode (the cut designation CM of the RAM 33) of "to cut each designated page" and "to equalize pages" is changed to a normal printing mode of "to print without inserting a blank page."

An effect of the above-described configuration is described.

Figure 13:
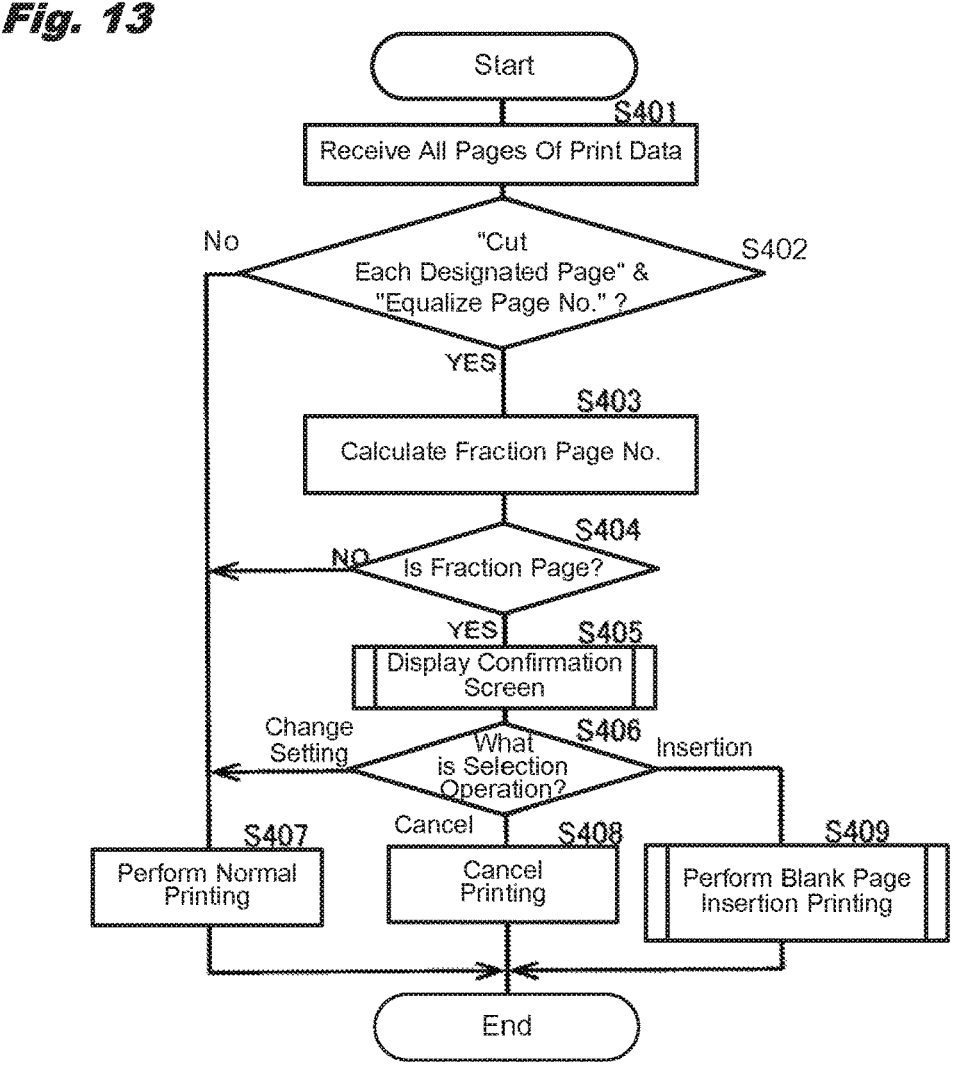
FIG. 13 is a flow diagram illustrating a flow of a print process of the second embodiment.

Next, a print process performed by the print apparatus is described according to steps each indicated with an "S" in the flow diagram of FIG. 13 which illustrates a flow of the print process of the second embodiment with reference to FIGS. 1 and 11.

S401-S403: The process at these steps is the same as the process at S101-S103 illustrated in FIG. 8 and thus description thereof is omitted.

S404: The print controller 40 of the print apparatus 30 determines presence or absence of the fraction page number RP calculated by the fraction page number calculation unit 42. When it is determined that there is a fraction page, that is, when it is determined that the fraction page number RP is not "0," the process proceeds to S405. When it is determined that there is not a fraction page, that is, when it is determined that the fraction page number RP is "0," the process proceeds to S407 in order to perform the normal printing.

S405: When it is determined that the fraction page number RP is not "0," that is, there is a fraction page, the print controller 40 displays, via the cut mode determination unit 411, the confirmation screen on the display unit 37 to allow a user to select in the confirmation screen any one of "to print by inserting a blank page," "to cancel printing," and "to print without inserting a blank page (normal printing)."

Figure 12:
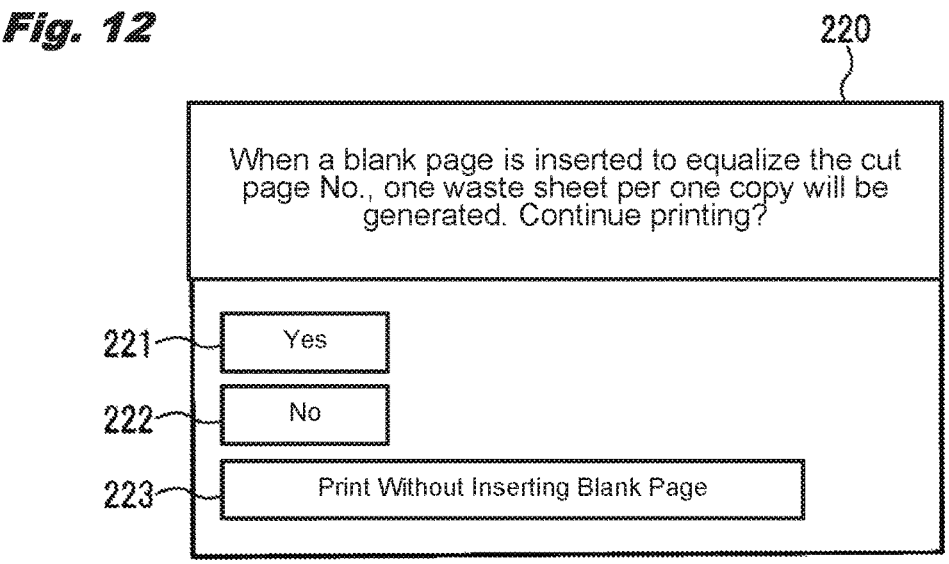
FIG. 12 is an explanatory diagram of a blank page insertion confirmation screen of the second embodiment.

The confirmation screen is, for example, a confirmation screen 220 illustrated in FIG. 12, and includes wording such "When a blank page is inserted to equalize the number of the cut pages, one waste sheet per one copy will be generated. Do you want to continue printing?" and a "Yes" button 221 instructing to continue printing, a "No" button 222 instructing not to continue printing (to cancel printing), and a "printing without inserting a blank page" button 223 instructing to perform normal printing.

Here, the term "waste sheet" means a blank page that occurs when printing is performed in which the cut page number is equalized by inserting a blank page. In the confirmation screen, the waste sheet number generated per one copy is calculated as "the cut page number CP—the fraction page number RP" stored in the RAM 33 and is displayed. The print controller 40 accepts, via the input unit 38, a selection operation of a user in the confirmation screen.

S406: When it is determined that the selection operation of the user in the confirmation screen is "to print by inserting a blank page" (the "Yes" button 221 of the confirmation screen 220 illustrated in FIG. 12), the print controller 40 causes the process to proceed to S409 in order to perform printing with inserting a blank page; when it is determined that the selection operation of the user is "to cancel printing" (the "No" button 222 of the confirmation screen 220 illustrated in FIG. 12), the print controller 40 causes the process to proceed to S408 in order to cancel printing; and when it is determined that the selection operation of the user is "to print without inserting a blank page (normal printing)" (the "printing without inserting a blank page" button 223 of the confirmation screen 220 illustrated in FIG. 12), the print controller 40 causes the process to proceed to S407 in order to perform normal printing.

S407: When it is determined that "to print without inserting a blank page (normal printing)" is selected, the print controller 40 changes, via the cut mode change unit 49, the cut mode (the cut designation CM of the RAM 33) of "to cut each designated page" and "to equalize pages" to the normal printing mode of "to print without inserting a blank page," and performs normal printing in which a blank page is not inserted, and terminates the present process.

S408: When it is determined that "to cancel printing" is selected, the print controller 40 cancels printing of the print data, and terminates the present process.

S409: When it is determined that "to print by inserting a blank page" is selected, the print controller 40 performs a blank page insertion print process, and terminates the present process.

In this way, in the present embodiment, when the print data includes a page number equalization designation, the print controller 40 of the print apparatus 30 displays the confirmation screen 220 illustrated in FIG. 12 on the display unit 37, and accepts a selection operation that permits or prohibits insertion of a blank page into the print data. When a selection operation that permits insertion of a blank page into the print data is accepted, the print controller 40 performs printing by inserting a blank page into the print data. When a selection operation that prohibits insertion of a blank page into the print data is accepted, the print controller 40 performs printing without inserting a blank page into the print data.

Therefore, in the present embodiment, it is possible to notify a user of the waste sheet number in the case where a blank page is inserted into the print data, and it is possible to allow a user to select to permit or prohibit insertion of a blank page into the print data, and it is possible to suppress a setting error not intended by a user. Further, it is possible to notify a user of the waste sheet number in advance before printing is performed.

As described above, in the second embodiment, in addition to the effect of the first embodiment, an effect is obtained that it is possible to notify, before printing is performed, a user of the waste sheet number in the case where a blank page is inserted into the print data.

Further, an effect is obtained that it is possible to allow a user to select to permit or prohibit insertion of a blank page into the print data and it is possible to suppress a setting error not intended by a user.

Third Embodiment

In a third embodiment, a process to equalize the print pages is performed by the print control apparatus. A configuration of the third embodiment is described based on a block diagram of FIG. 15 illustrating a configuration of a printing system of the third embodiment.

A part that is the same as in the above-described first embodiment is indicated using the same reference numeral symbol and description thereof is omitted.

Figure 15:
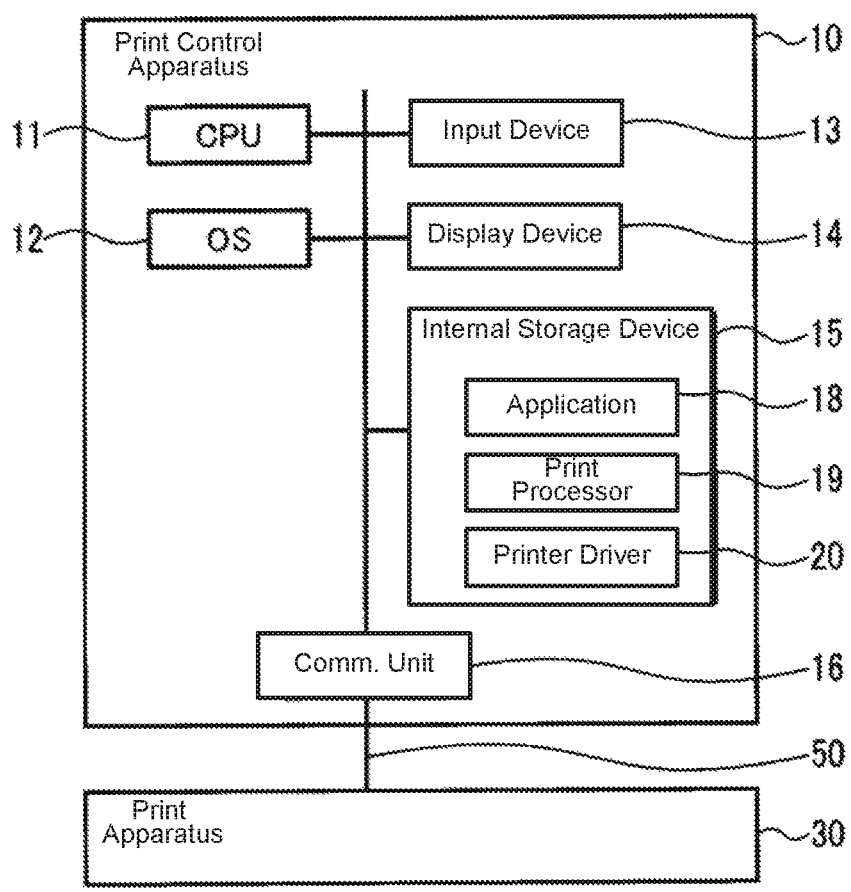
FIG. 15 is a block diagram illustrating a configuration of a printing system of a third embodiment.

In FIG. 15, the print control apparatus 10 generates the print data of the print apparatus 30 which performs carrying, cutting and printing of a continuous medium, and includes a CPU 11, an OS 12, an input device 13, a display device 14, an internal storage device 15, and a communication unit 16.

The internal storage device 15 is a storage device such as a memory, and stores various programs (software) such as an application 18, a print processor 19 and a printer driver 20, and various kinds of information. Further, the application 18, the print processor 19, and the printer driver 20 are programs (software) performed by the CPU 11.

The application 18 is software for editing documents such as document editing software and spreadsheet software, and is software for outputting print data of an edited document.

The OS 12 is basic software controlling the print control apparatus 10, and manages various programs performed by the CPU 11 in units called processes. Therefore, in a state in which the application 18 is performed by the CPU 11, an application process is running.

Further, the OS 12 has a function of generating print data that is independent of the model of the print apparatus. The print processor 19 processes a file generated and spooled by the OS 12 or the printer driver 20, and is performed by a print spooler process of the OS 12.

The printer driver 20 as a printing control program generates, based on input data from the application 18, a print job as the print data that can be printed by the print apparatus 30. The printer driver 20 is called from the application 18 or the print processor 19 to generate the print data. The print data generated by the printer driver 20 is transmitted to the print apparatus 30 via the communication unit 16.

The print data output from the application 18 is transmitted via (accumulation at) a spooler of the OS 12 to the print apparatus 30. For the operation of the spooler of the OS 12, there are two modes including an EMF mode as a first mode and an RAW mode as a second mode.

The EMF mode is a mode in which print data in a data format independent of the model (print apparatus language) of the print apparatus 30 is accumulated as an EMF spool file as a first spool file in a spooler. The print data accumulated in the EMF spool file is generated by the OS 12.

The RAW mode is a mode in which print data in a data format dependent of the model (print apparatus language) of the print apparatus 30 is accumulated as an RAW spool file as a second spool file in a spooler. The print data accumulated in the RAW spool file is the print data generated by the printer driver 20. The EMF mode or the RAW mode can be set by the OS 12 or the printer driver 20.

The print apparatus 30 performs carrying, cutting and printing of the continuous medium according to the print data received from the print control apparatus 10. Therefore, in the case where a blank page is added to the print data received from the print control apparatus 10, printing including the blank page is performed according to the print data. The print apparatus 30 of the present embodiment does not perform a process in which a blank page is added to the print data received from the print control apparatus 10.

Figure 16A:
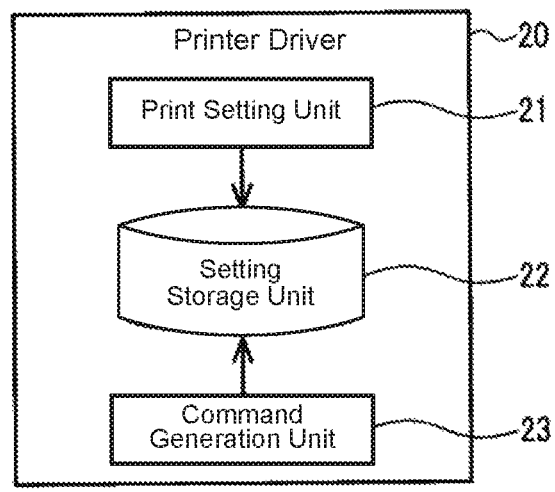
FIGS. 16A and 16B are block diagrams illustrating configurations of printer drivers of the third embodiment.
Figure 16B:
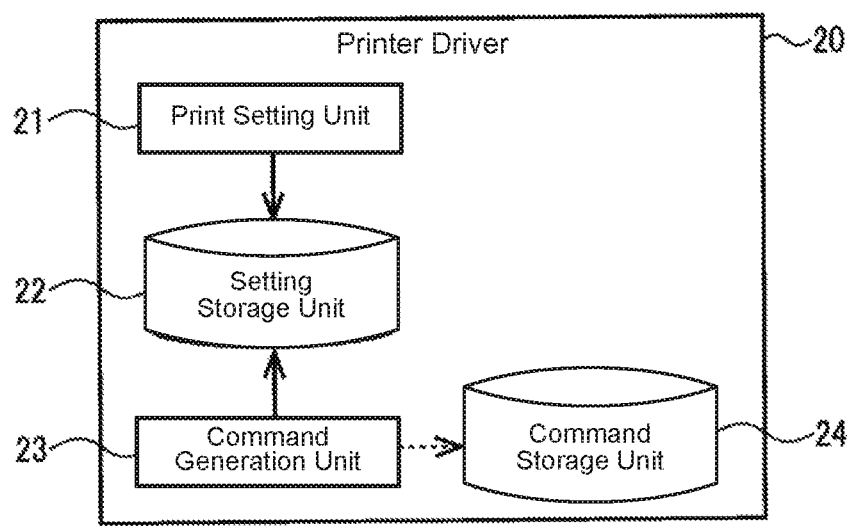

FIGS. 16A and 16B are block diagrams illustrating configurations of printer drivers of the third embodiment. FIG. 16A illustrates the configuration of the printer driver 20 of the EMF mode, and FIG. 16B illustrates the configuration of the printer driver 20 of the RAW mode. First, the configuration of the printer driver 20 of the EMF mode is described with reference to FIG. 16A.

In FIG. 16A, the printer driver 20 includes a print setting unit 21, a setting storage unit 22, and a command generation unit 23.

The print setting unit 21 displays a print setting screen on the display device 14 illustrated in FIG. 15, and performs various print settings by accepting input operations of print setting information by a user on the print setting screen.

Figure 21:
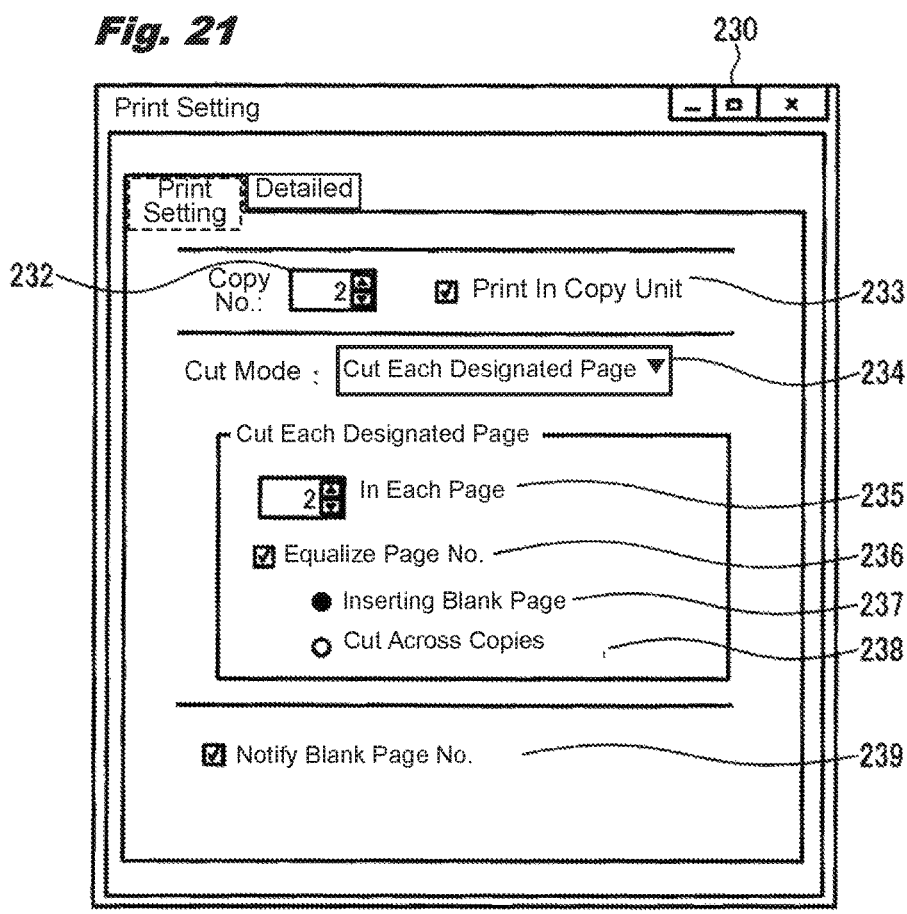
FIG. 21 is an explanatory diagram of a print setting screen of the third embodiment.

The print setting screen is, for example, a print setting screen 230 illustrated in FIG. 21, and has a copy number 232, a copy unit printing designation 233, a cut mode designation 234, a cut page number 235, a page equalization designation 236, a blank page insertion designation 237, a blank page non-insertion designation 238, and a blank page number notification designation 239.

The copy number 232 specifies the number of the print copies of the print data generated from input data from application software as an upper layer.

The copy unit printing designation 233 instructs to perform copy unit printing in which the print data is printed in copy units. For the copy unit printing designation 233, the print copy number designated by the copy number 232 may be "1" or "2" or more (multiple copies). In the present embodiment, a description is given in which it is assumed that multiple copies is designated by the copy number 232 and, in the case of printing the multiple copies, copy unit printing is designated by the copy unit printing designation 233.

The cut mode designation 234 specifies a method for cutting the medium. In the present embodiment, it is assumed that "to cut each designated page" is designated in which the medium is cut for each designated page.

In the case where "to cut each designated page" is designated by the cut mode designation 234, the cut page number 235 as the cut page number specifies the page number such that the medium is cut for every predetermined page number. The medium is cut for every page number designated by the cut page number 235. For example, in the case where "for every 2 pages" is designated by the cut page number 235, the medium is cut after the page 1 and the page 2 of the print data (between the page 2 and the page 3).

In the case where "to cut each designated page" is designated by the cut mode designation 234, the page equalization designation 236 as a page number equalization designation specifies (selects) whether or not to equalize the page number of the medium to be cut. The blank page insertion designation 237 specifies (selects) to insert a blank page and to equalize the page number of the medium to be cut.

The term "to equalize the page number by inserting a blank page" means that, in the case where a trailing end of a copy unit of the print data does not match the page number that is designated by the cut page number 235 and with which the medium is to be cut, a blank page is added to the end of the print data to perform equalization such that the trailing end of the copy unit of the print data matches the page number that is designated by the cut page number 235 and with which the medium is to be cut.

The blank page non-insertion designation 238 specifies (selects) to equalize the page number of the medium to be cut without inserting a blank page. In the case of this designation, the medium is cut with the page number designated by the cut page number 235 even when the cutting position is not the trailing end of a copy unit of the print data. That is the medium is cut across copies.

In the case where the blank page insertion designation 237 specifies to insert a blank page, the blank page number notification designation 239 specifies (selects) to display, on the display device 14 illustrated in FIG. 15, the blank page number that have occurred until the printing of the print data is completed.

In this way, the print setting unit 21 displays the print setting screen on the display device 14 illustrated in FIG. 15 and accepts, via the print setting screen, inputs such as a copy unit printing designation, a cut page number and a page number equalization designation.

For example, in the case where "2" is designated as the print setting information by the copy number 232, "to print in copy units" is designated by the copy unit printing designation 233, "to cut each designated page" is designated by the cut mode designation 234, "for every 2 pages" is designated by the cut page number 235, "to equalize the page number" is designated by the "page equalization designation 236, and "to insert a blank page" is designated (selected) by the blank page insertion designation 237, the printed result is as illustrated in FIG. 23A.

In FIG. 23A, regarding positions at which the medium P is cut, from a leading edge of the medium P in the medium carrying direction, as the first copy BK1, the medium P is cut at a cutting position C1 after a PAGE 1 as the first page and a PAGE 2 as the second page, and then is cut at a cutting position C2 after a PAGE 3 as the third page and a blank page V.

Further, as the second copy BK2, the medium P is cut at a cutting position C3 after the PAGE 1 and the PAGE 2, and then is cut at a cutting position C4 after the PAGE 3 and the blank page V. At the cutting position C1 and the cutting position C3, since the cut page number is designated as "2," the medium P is cut after 2 pages including the PAGE 1 and the PAGE 2.

Further, at the cutting position C2 and the cutting position C4, since "to cut each designated page" and "to equalize the page number by inserting a blank page" are designated, a blank page is inserted next to the PAGE 3 (the final page), and the medium P is cut after 2 pages of the print data.

Further, in the case where "to cut across copies" is designated (selected) as the print setting information by the blank page non-insertion designation 238, the print result is as illustrated in FIG. 23B. It is assumed that "2" is designated by the copy number 232, "to print in copy units" is designated by the copy unit printing designation 233, "to cut each designated page" is designated by the cut mode designation 234, "to cut every 2 pages" is designated by the cut page number 235, and "to equalize the page number" is designated by the page equalization designation 236.

In FIG. 23B, regarding positions at which the medium P is cut, from a leading edge of the medium P in the medium carrying direction, the medium P is cut at a cutting position C1 after the PAGE 2 as the second page of the first copy BK1, and then is cut at a cutting position C2 after the PAGE 1 as the first page of the second copy BK2. Further, the medium P is cut at a cutting position C3 after the PAGE 3 of the second copy BK2. In this way, a blank page is not inserted, and normal printing and cutting are performed.

Returning to the description of FIG. 16A, the setting storage unit 22 is a storage device that stores the print setting information accepted by the print setting unit 21. Based on the print setting information stored in the setting storage unit 22, the command generation unit 23 as a print data generation unit converts the input data from the application software into commands that can be recognized by the print apparatus 30 illustrated in FIG. 15 and generates a print job as the print data.

The command generation unit 23 generates image data of blank pages of a number corresponding to the page number obtained by subtracting the fraction page number from the cut page number designated by the cut page number 235 of the print setting screen 230 illustrated in FIG. 21, and adds the image data of the blank pages to the trailing end of the print pages.

That is, when the print page number in printing the print data in copy units is not a multiple of the number of the cut pages, the command generation unit 23 inserts blank pages into the print data such that the print page number is a multiple of the cut page number and the page number is equalized when the medium is cut.

Next, the configuration of the printer driver 20 of the RAW mode is described with reference to FIG. 16B.

In FIG. 16B, the printer driver 20 includes a print setting unit 21, a setting storage unit 22, a command generation unit 23, and a command storage unit 24. The printer driver 20 of the RAW mode has a configuration obtained by adding the command storage unit 24 to the configuration of the printer driver 20 of the EMF mode. The print setting unit 21, the setting storage unit 22, and the command generation unit 23 respectively have the same configurations as those of the EMF mode and thus a description thereof is omitted.

The command storage unit 24 stores the print data generated by the command generation unit 23 in the storage device.

Figure 17:
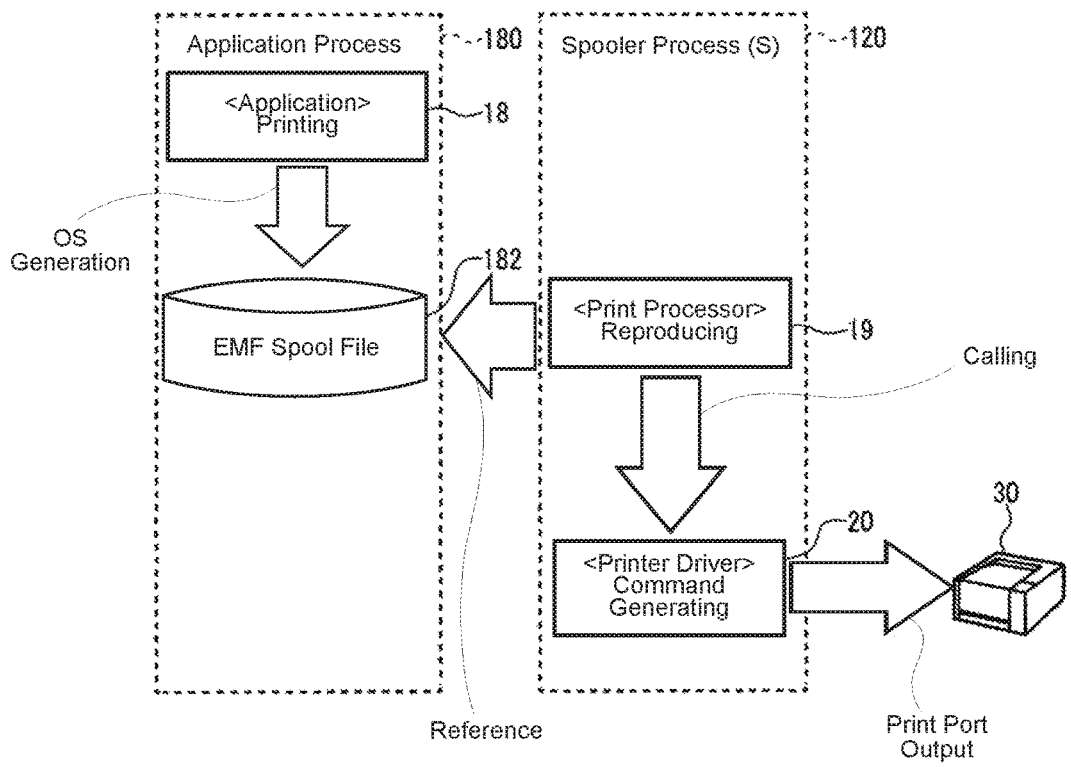
FIG. 17 is an explanatory diagram of a print operation of an EMF mode of the third embodiment.

Next, a print operation of the EMF mode performed by the print control apparatus is described based on the explanatory diagram of FIG. 17 of the print operation of the EMF mode of the third embodiment with reference to FIGS. 15 and 16A. Here, operations of an application process 180 of the application 18 and a spooler process 120 of the OS 12 are described.

In FIG. 17, when printing (processing) is started in the application 18, the OS 12 generates an EMF spool file 182 of a format independent of the printer language (print apparatus language) of the print apparatus 30. The spooler which is a resident component of the OS 12 uses the print processor 19 in its sown process to call the printer driver 20, and references and reproduces the EMF spool file 182. When the EMF spool file 182 is referenced and reproduced, the command generation unit 23 of the printer driver 20 generates the print data which is a command dependent on the print apparatus 30. Thereafter, the printer driver 20 outputs the generated print data from a print port, and transmits the print data to the print apparatus 30, and performs printing.

Figure 18:
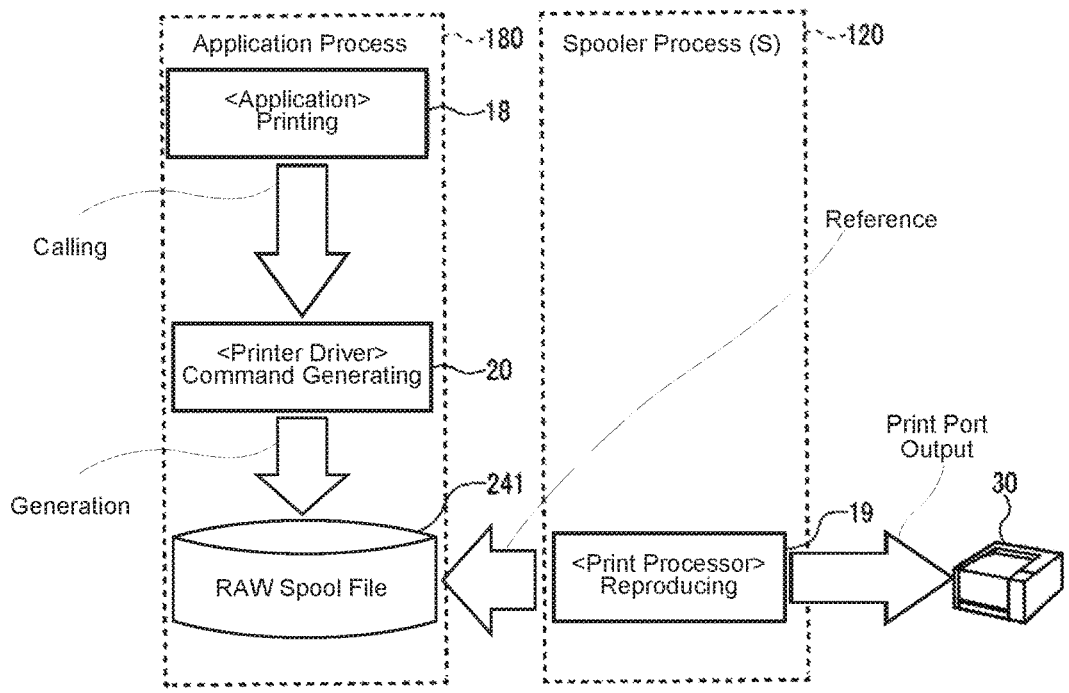
FIG. 18 is an explanatory diagram of a print operation of a RAW mode of the third embodiment.

Next, a print operation of the RAW mode performed by the print control apparatus is described based on the explanatory diagram of FIG. 18 of the print operation of the RAW mode of the third embodiment with reference to FIGS. 15 and 16B. Also here, operations of an application process 180 of the application 18 and a spooler process 120 of the OS 12 are described.

In FIG. 18, when printing (processing) is started in the application 18, the application 18 calls the printer driver 20 and generates the print data which is a command dependent on the printer language (print apparatus language) of the print apparatus 30. The command generation unit 23 of the printer driver 20 generates the print data and accumulates the print data as a RAW spool file 241 of the command storage unit 24. The spooler process 120 uses its own print processor 19 to output from a print port the print data accumulated in the RAW spool file 241, and transmits the print data to the print apparatus 30, and performs printing.

An effect of the above-described configuration is described.

Figure 19:
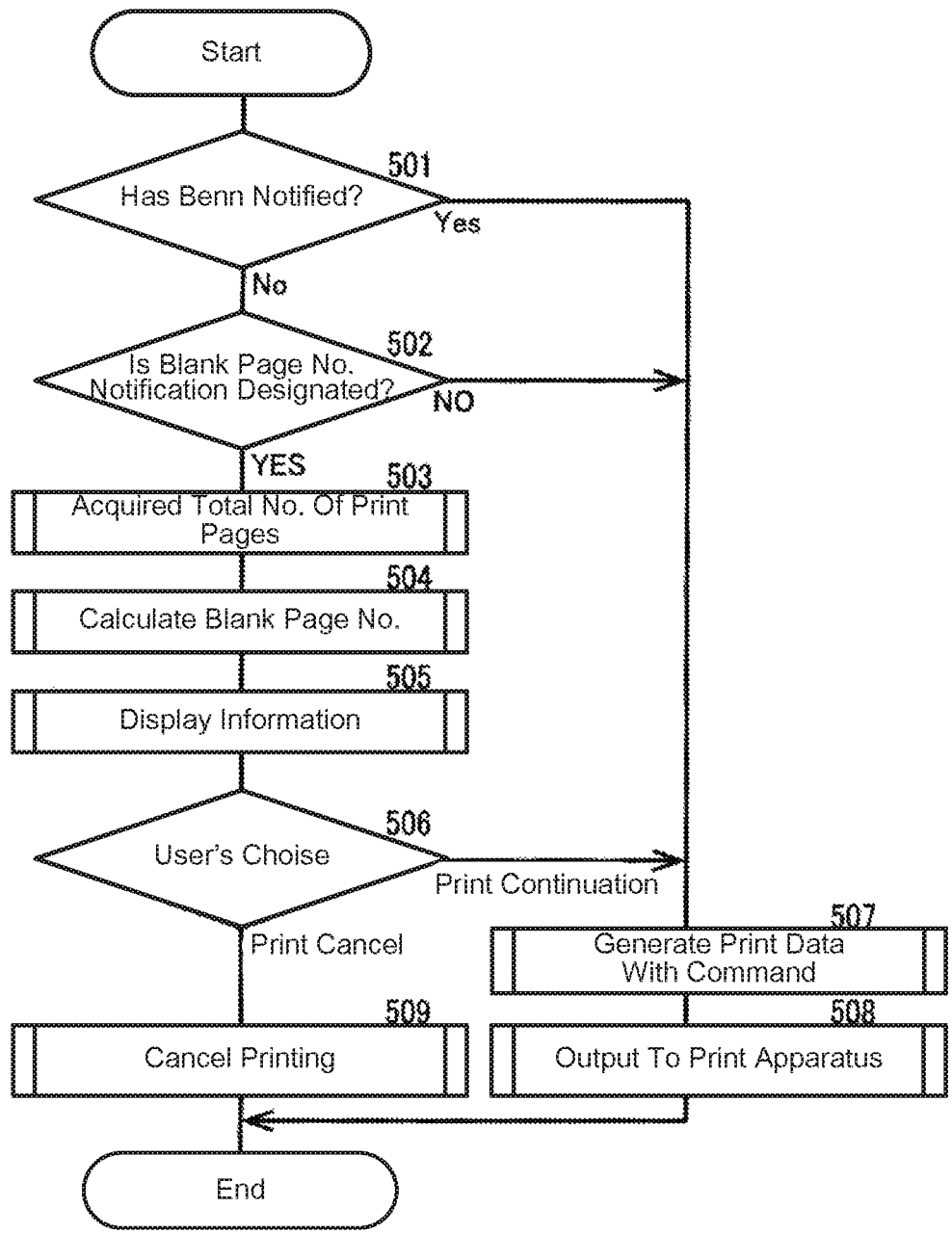
FIG. 19 is a flow diagram illustrating a flow of a print process of the EMF mode of the third embodiment.

First, a print setting process performed by the printer driver 20 of the print control apparatus 10 illustrated in FIG. 15 is described based on FIGS. 16A and 16B with reference to FIGS. 15 and 19.

The print setting unit 21 of the printer driver 20 displays the print setting screen 230 (see FIG. 19) on the display device 14 in order to allow a user to perform print setting before the print data is transmitted to the print apparatus 30.

The print setting unit 21 having displayed the print setting screen 230 receives a print setting input operation by a user in the print setting screen 230 and stores the input print setting information in the setting storage unit 22.

In the present embodiment, it is assumed that, in the print setting screen 230, for example, "2" is designated by the copy number 232; "to print in copy units" is designated by the copy unit printing designation 233; "to cut each designated page" is designated by the cut mode designation 234; "2" is designated by the cut page number 235; "to equalize the page number" is designated by the page equalization designation 236, and "to insert a blank page" is designated by the blank page insertion designation 237.

The command generation unit 23 of the printer driver 20 generates input data from the application software as the print data for the print apparatus 30 in accordance with the print setting information stored in the setting storage unit 22 according to the EMF mode or the RAW mode set by the OS 12, and transmits the print data to the print apparatus 30.

Next, a print process performed by the print control apparatus in the EMF mode is described according to steps each indicated with an "S" in the flow diagram of FIG. 19 which illustrates a flow of the print process of the EMF mode of the third embodiment with reference to FIGS. 15, 16A, 17 and 21. The print process illustrated in FIG. 19 is a print process of the printer driver 20 in the EMF mode, and the print pages are called one by one from the spooler process (the print processor 19) of the OS 12.

S501: The printer driver 20 of the print control apparatus 10 refers to notified information in the internal storage device 15, displays the blank page number on the display device 14, and determines whether or not an operator has been notified of the blank page number. When it is determined that the operator has been notified of the blank page number, the process proceeds to S507 in order to generate the print data. When it is determined that the operator has not been notified the blank page number, the process proceeds to S502.

S502: The printer driver 20 having determined that the operator has not been notified of the blank page number determines, in the print setting screen 230, whether or not "to equalize the page number of the medium" is designated (selected) by the page equalization designation 236, and whether or not "to insert a blank page" is designated (selected) by the blank page insertion designation 237, and whether or not the blank page number notification designation 239 is designated (selected). When it is determined that all items are designated, that is, "to notify the operator of the blank page number" is designated, the process proceeds to S503. Otherwise, that is, it is determined that "not to notify the operator of the blank page number" is designated, the process proceeds to S507 in order to generate the print data.

S503: The printer driver 20 having determined that "to notify the operator of the blank page number" is designated acquires, via the print processor 19, the total print page number of the input data from the application 18 by referring to the EMF spool file 182. Since the print information of all the pages is accumulated in the EMF spool file 182, the total print page number can be acquired.

S504: Next, the printer driver 20 calculates the blank page number. For example, the total print page number obtained at S503 is "3." In the case where, in the print setting screen 230, "2" is designated by the copy number 232, "to print in copy units" is designated by the copy unit printing designation 233, "to cut each designated page" is designated by the cut mode designation 234, and "2" is designated by the cut page number 235, the fraction page number per one copy is the remainder of (the total print page number)÷(the number of the cut pages), and the remainder of 3÷2 is "1." Therefore, the blank page number per one copy is "1."

In the present embodiment, the description is given in which, in the print setting screen 230, "2" is designated by the copy number 232. However, even in the case where "1" or "3" or more is designated by the copy number 232, the blank page number per one copy is "1."

S505: When the blank page number per one copy is calculated, the printer driver 20 displays a notification screen as an information display on the display device 14 in order to notify the operator of the blank page number per one copy. The notification screen is, for example, a notification screen 250 illustrated in FIG. 22, and is a screen in which wording such as "one waste sheet per one copy occurs" and a print continue button 251 and a print cancel button 252 are displayed.

In this way, based on the EMF spool file 182, the printer driver 20 displays on the display device 14 the blank page number occurring per copy unit. The printer driver 20 stores, in the internal storage device 15, information (notified information) in the notification screen displayed on the display device 14.

S506: The printer driver 20 as a selection unit determines whether or not a user has selected the print continue button (the print continue button 251 in FIG. 22) to continue printing or the print cancel button (the print cancel button 252 in FIG. 22) to cancel printing in the notification screen. When it is determined that the print continue button has been selected, the process proceeds to S507 in order to continue printing. When it is determined that the print cancel button has been selected, the process proceeds to S509 in order to cancel printing.

In this way, the printer driver 20 has a function as a selection unit that accepts a selection operation for continuing or canceling printing.

S507: The printer driver 20 generates the print data for one page worth with a command depending on the model of the print apparatus 30. In the case where "to insert a blank page" is designated (selected) by the blank page insertion designation 237 in the print setting screen 230, when generation of the print data for each copy is completed, the printer driver 20 inserts blank pages of a number equal to the blank page number calculated at S504 to the trailing end of the print data.

S508: The printer driver 20 outputs, via the print port, the print data to the print apparatus 30, and terminates the present process.

S509: The printer driver 20 having determined that the print cancel button has been selected at S506 terminates the present process without generating the print data. When the print cancel button is selected, thereafter, the print process started from the application 18 is terminated without calling the printer driver 20 from the spooler process of the OS 12.

The method of inserting a blank page into the print data is the same as in the first embodiment. It is also possible to insert a blank page before the foremost page of the print data. Further, it is also possible that, in the case of multiple print copies, the above process is repeated for a number of times equal to the print copy number. It is also possible that the information indicating the print copy number is output to the print apparatus 30, and the print apparatus 30 repeats printing based on the print data for a number of times equal to the print copy number.

Figure 20:
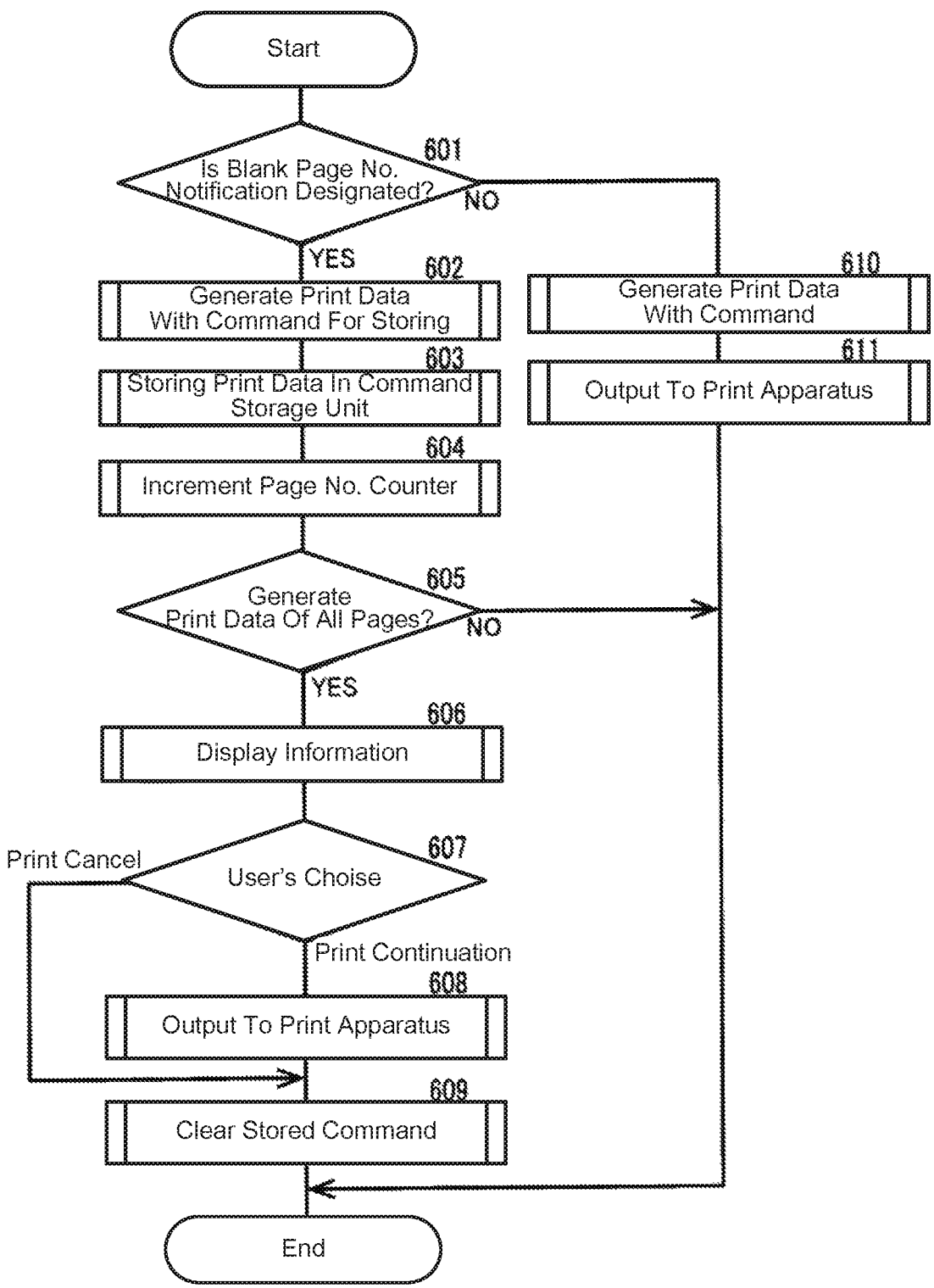
FIG. 20 is a flow diagram illustrating a flow of a print process of the RAW mode of the third embodiment.

Next, a print process performed by the print control apparatus in the RAW mode is described according to steps each indicated with an "S" in the flow diagram of FIG. 20 which illustrates a flow of the print process of the RAW mode of the third embodiment with reference to FIGS. 15, 16B, 18 and 21. The print process illustrated in FIG. 20 is a print process of the printer driver 20 in the RAW mode, and the print pages are called one by one from the spooler process of the OS 12.

S601: The printer driver 20 of print control apparatus 10 determines, in the print setting screen 230, whether or not "to equalize the page number of the medium" is designated (selected) by the page equalization designation 236, and whether or not "to insert a blank page" is designated (selected) by the blank page insertion designation 237, and whether or not the blank page number notification designation 239 is designated (selected). When it is determined that all items are designated, that is, when it is determined that "to notify the operator of the blank page number" is designated, the process proceeds to S602. Otherwise, that is, it is determined that "not to notify the operator of the blank page number" is designated, the process proceeds to S610 in order to generate the print data.

S602: The printer driver 20 having determined that "to notify the operator of the blank page number" is designated generates the print data for one page worth with a command (or command for storing) depending on the model of the print apparatus 30.

S603: The printer driver 20 stores in the command storage unit 24 the generated print data for the one page worth as the RAW spool file 241.

S604: When print data for one page worth is stored in the command storage unit 24, the printer driver 20 adds "1" to a page number counter for counting the total print page number and updates the page number counter (or Increment Page No. Counter). The page number counter is stored in the internal storage device 15.

S605: The printer driver 20 determines whether or not the print data of all pages has been generated. When it is determined that generation of the print data of all pages has been completed, the process proceeds to S606. When it is determined that generation of the print data of all pages has not been completed, the present process is terminated.

S606: The printer driver 20 calculates the blank page number in the same manner as in S504 of FIG. 19. When the blank page number per one copy is calculated, the printer driver 20 displays a notification screen as an information display on the display device 14 in order to notify the operator of the blank page number per one copy. The notification screen is, for example, the notification screen 250 illustrated in FIG. 22, and is a screen in which the wording such as "one waste sheet per one copy occurs" and the print continue button 251 and the print cancel button 252 are displayed.

In this way, when the print data has been accumulated in the RAW spool file 241, the printer driver 20 displays on the display device 14 the blank page number occurring per copy unit.

S607: The printer driver 20 as a selection unit determines whether or not a user has selected the print continue button (the print continue button 251 in FIG. 22) to continue printing or the print cancel button (the print cancel button 252 in FIG. 22) to cancel printing in the notification screen. When it is determined that the print continue button has been selected, the process proceeds to S608 in order to continue printing. When it is determined that the print cancel button has been selected, the process proceeds to S609 in order to cancel printing.

S608: The printer driver 20 reads out print data for one page worth stored in the command storage unit 24, and outputs the print data for one page worth via the print port to the print apparatus 30. When the generation of the print data for each copy is completed, the printer driver 20 inserts the blank pages of a number equal to the blank page number calculated at S606 into the trailing end of the print data. In this way, when an input operation of permission is accepted, the printer driver 20 inserts the blank pages into the print data.

S609: The printer driver 20 erases the print data stored in the command storage unit 24, that is, clears the command stored in the command storage unit 24, and terminates the present process.

S610: On the other hand, the printer driver 20 having determined that "not to notify the operator of the blank page number" is designated at S601 generates print data for one page worth with a command depending on the model of the print apparatus 30 in order to perform normal printing.

S611: The printer driver 20 outputs, via the print port, the print data to the print apparatus 30, and terminates the present process.

The method of inserting a blank page into the print data is the same as in the first embodiment. It is also possible to insert a blank page before the foremost page of the print data. Further, it is also possible that, in the case of multiple print copies, the above process is repeated for a number of times equal to the print copy number. It is also possible that the information indicating the print copy number is output to the print apparatus 30, and the print apparatus 30 repeats printing based on the print data for a number of times equal to the print copy number.

In this way, in the present embodiment, in the case where copy unit printing is instructed by the print data and it is determined that a page number equalization designation is included in the print data, when the print page number in printing the print data in copy units is not a multiple of the number of the cut pages, by inserting a blank page into the print data to make the print page number a multiple of the number of the cut pages, the printer driver 20 of the print control apparatus 10 can equalize the length of the cut medium in the copy unit printing.

Figure 22:
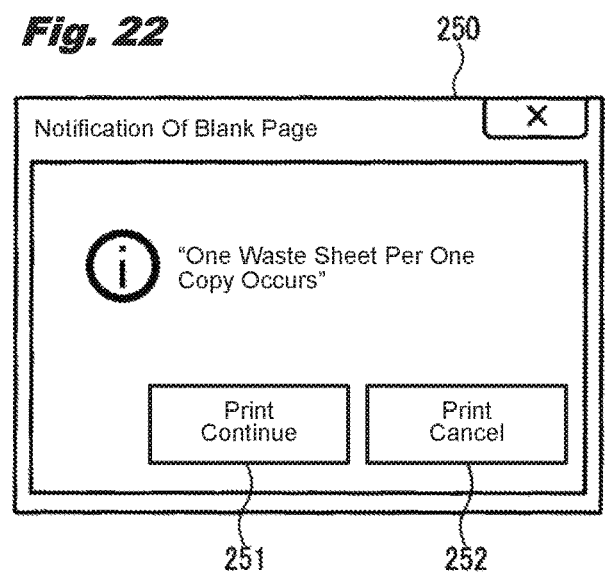
FIG. 22 is an explanatory diagram of a notification screen of the third embodiment.

Further, in the case where the page number equalization designation is included in the print data, the printer driver 20 of the print control apparatus 10 displays the notification screen 230 illustrated in FIG. 22 on the display device 14, notifies the operator of the waste sheet number generated per one copy and accepts a selection operation to continue or cancel printing. When an input operation to continue printing is accepted, printing is performed by inserting a blank page into the print data. When an input operation to cancel printing is accepted, printing is canceled.

Therefore, in the present embodiment, it is possible to notify a user of the waste sheet number per one copy in the case where a blank page is inserted into the print data, and it is possible to allow a user to select to permit (continue) or prohibit (cancel) printing, and it is possible to suppress a setting error not intended by a user. Further, it is possible to notify a user of the waste sheet number in advance before printing is performed.

In the present embodiment, an example is described in which the print copy number is "2." However, even in the case where the print copy number is designated as "1" or "3" or more, the length of the cut medium in printing in copy units can be equalized. This also applies to the first embodiment and the second embodiment. As described above, in the third embodiment, in addition to the effect of the first embodiment, an effect is obtained that it is possible to notify, before printing is performed, a user of the waste sheet number in the case where a blank page is into the print data.

Further, an effect is obtained that it is possible to allow a user to select to permit (continue) or prohibit (cancel) printing and it is possible to suppress a setting error not intended by a user. In the first embodiment, the second embodiment and the third embodiment, the print apparatus is described as a printer. However, the print apparatus may also be a facsimile machine, a multifunction peripheral (MFP), or the like. Further, the print apparatus is described as an electrophotographic printer. However, without being limited to this, the print apparatus may also be an ink jet type printer.

As discussed at S201, the print pages are generated from the print data, each of the print pages including an image data fitting for a single page of the medium. The print page generation unit generates a print page for the first page, then generates another print page for the second page. It continues until all of the print data is converted into the print pages. When the conversion is completed, the print page number (or No. of print page) is counted based on the amount of print pages.

What is claimed is:

1. A print method in which carrying, cutting and printing of a continuous medium are performed according to print data, comprising:
   generating the print data that includes;
       a copy unit printing designation instructing to print the print data in copy units,
       a cut page number instructing to cut the medium for every page number, which is the same as the cut page number, in a medium carrying direction, and
       a page number equalization designation instructing to equalize the page number of the medium to be cut;
   determining whether or not the page number equalization designation is included in the print data and whether or not a total number of print pages in printing the print data in the copy units is not a multiple of the cut page number; and
   inserting one or more of blank pages into the print data in order to make the total number of print pages, to which the blank pages are added, equal to the multiple of the cut page number when the page number equalization designation is included and the total number of print pages is not the multiple of the cut page number.

2. The print method according to claim 1, wherein the copy unit printing designation includes a positive integer and instructs to repeat the printing at the same times as the positive integer so that the same number of copies of the print pages are printed.

3. The print method according to claim 1, further comprising:
   displaying a print setting screen, wherein
   the copy unit printing designation, the cut page number and the page number equalization designation are input through the print setting screen.

4. The print method according to claim 1, wherein in inserting the one or more of blank pages into the print data, the blank pages are inserted next to a final page of the print data.

5. The print method according to claim 1, wherein in inserting the one or more of blank pages into the print data, the blank pages are inserted prior to a foremost page of the print data.

6. The print method according to claim 1, further comprising:
   accepting a selection operation indicating either to permit or to prohibit insertion of the blank pages into the print data when the print data includes the page number equalization designation, wherein
   in inserting the one or more of blank pages into the print data, the blank pages are inserted into the print data only when the selection operation indicating to permit the insertion is received.

7. A print system for printing on a continuous medium, comprising:
   a print control apparatus having a processor that is configured to generate print data, and
   a print apparatus that
       carries in a medium carrying direction and cuts the medium, and
       performs the printing on the medium according to the print data, wherein
   the print control apparatus is provided with a print data generation unit by which the print data is generated, the print data including;
       a copy unit printing designation instructing to print the print data in copy units,
       a cut page number instructing to cut the medium for every page number, which is the same as the cut page number, in the medium carrying direction, and
       a page number equalization designation instructing to equalize the page number of the medium to be cut, wherein
   the print apparatus further includes a print controller that inserts one or more of blank pages into the print data in order to make a total number of print pages, to which the blank pages are added, equal to a multiple of the cut page number when the page number equalization designation is included in the print data and the total number of print pages in printing the print data in the copy units is not a multiple of the cut page number.

8. The print system according to claim 7, wherein the copy unit printing designation includes a positive integer and instructs to repeat the printing at the same times as the positive integer so that the same number of copies of the print pages are printed.

9. The print system according to claim 7, wherein the print control apparatus is provided with
   a display device that displays a print setting screen, and
   a print setting unit to which the copy unit printing designation, the cut page number and the page number equalization designation are input through the print setting screen of the display device.

10. The print system according to claim 7, wherein the print controller inserts the blank pages prior to a foremost page of the print data.

11. The print system according to claim 7, wherein the print apparatus is provided with a selection unit that accepts a selection operation indicating either to permit or to prohibit insertion of the blank pages into the print data when the print data includes the page number equalization designation,
   when receiving the selection operation indicating to permit the insertion, the print apparatus inserts the blank pages into the print data.

12. The print system according to claim 9, wherein the print apparatus is provided with a selection unit that accepts a selection operation through the display device, the selection operation indicating either to permit or to prohibit insertion of the blank pages into the print data when the print data includes the page number equalization designation,
   when receiving the selection operation indicating to permit the insertion, the print apparatus inserts the blank pages into the print data.

13. The print system according to claim 9, wherein the print control apparatus is provided with a selection unit that accepts a selection operation indicating either to continue the printing or to cancel the printing when the print setting unit receives the page number equalization designation, and
   the print control apparatus continues to print when the selection unit accepts the selection operation indicating to continue the printing.

14. The print system according to claim 7, wherein the print controller inserts the blank pages next to a final page of the print data.

15. The print system according to claim 11, wherein when receiving the selection operation indicating to prohibit the insertion, the print apparatus perform the printing without inserting the blank pages into the print data.

16. The print system according to claim 15, wherein the print control apparatus cancel to print when the selection unit accepts the selection operation indicating to cancel the printing.

17. The print system according to claim 15, wherein the print control apparatus accumulates the print data in two different modes that are a first mode and a second mode,
   in the first mode, the print data is accumulated as a first spool file, which is independent of a print apparatus language, and
   in the second mode, the print data is accumulated as a second spool file, which is dependent of the print apparatus language,
in a case of the first mode, a blank page number of the blank pages, which is generated in the copy unit based on the first spool file, is displayed on the display device, and
in a case of the second mode, when the print data is accumulated in the second spool file, another blank page number of the blank pages, which is generated in the copy unit, is displayed on the display device and the selection unit accepts the selection operation.

* * * * *